United States Patent
Haynes et al.

(10) Patent No.: US 10,630,348 B1
(45) Date of Patent: Apr. 21, 2020

(54) MESH TOPOLOGY RADIO

(71) Applicant: Vivint, Inc., Provo, UT (US)

(72) Inventors: Stephen John Haynes, Lehi, UT (US); Michael John Hart, San Jose, CA (US); Kevin Ross, Lehi, UT (US)

(73) Assignee: Vivint Wireless, Inc., Provo, UT (US)

( * ) Notice: Subject to any disclaimer, the term of this patent is extended or adjusted under 35 U.S.C. 154(b) by 0 days.

(21) Appl. No.: 15/848,482

(22) Filed: Dec. 20, 2017

Related U.S. Application Data

(63) Continuation-in-part of application No. 15/603,804, filed on May 24, 2017.

(51) Int. Cl.
| | |
|---|---|
| *H04B 7/0413* | (2017.01) |
| *H04B 7/26* | (2006.01) |
| *H04W 16/14* | (2009.01) |
| *H04B 7/08* | (2006.01) |
| *H04B 7/024* | (2017.01) |

(52) U.S. Cl.
CPC ......... *H04B 7/0413* (2013.01); *H04B 7/2628* (2013.01); *H04W 16/14* (2013.01); *H04B 7/024* (2013.01); *H04B 7/0857* (2013.01); *H04B 7/2662* (2013.01)

(58) Field of Classification Search
CPC .... H04B 7/0413; H04B 7/2628; H04B 7/024; H04B 7/2662; H04B 7/0857; H04W 16/14

See application file for complete search history.

(56) References Cited

U.S. PATENT DOCUMENTS

| | | | |
|---|---|---|---|
| 7,062,305 B1 | 6/2006 | Cameron et al. | |
| 2003/0136575 A1* | 7/2003 | Murr | H05K 3/34 174/66 |
| 2007/0002794 A1 | 1/2007 | Demirhan et al. | |
| 2008/0280656 A1 | 11/2008 | Gonikberg et al. | |
| 2009/0219207 A1* | 9/2009 | Shibuya | H04B 7/0808 342/367 |
| 2009/0245159 A1 | 10/2009 | Oyman et al. | |
| 2010/0214979 A1 | 8/2010 | Kuehnel et al. | |
| 2010/0260146 A1 | 10/2010 | Lu | |
| 2010/0278118 A1 | 11/2010 | Gossain et al. | |
| 2010/0316033 A1 | 12/2010 | Atwal | |
| 2011/0279347 A1* | 11/2011 | Pass | H01Q 1/1242 343/890 |
| 2012/0195296 A1* | 8/2012 | Adachi | H04W 16/14 370/338 |
| 2013/0223286 A1 | 8/2013 | Corinella et al. | |
| 2013/0231045 A1 | 9/2013 | Duerksen | |

(Continued)

OTHER PUBLICATIONS

PCT International Search Report for International Application No. PCT/US2018/031137, dated Oct. 1, 2018 (3 pp.).

*Primary Examiner* — Robert M Morlan
*Assistant Examiner* — Wilfred Thomas
(74) *Attorney, Agent, or Firm* — Holland & Hart, LLP

(57) ABSTRACT

An apparatus for wireless communication in a millimeter wave (mmW) mesh network is described. The apparatus may include a processor, memory in electronic communication with the processor, a radio component including a plurality of mmW radios in electronic communication with the processor, each mmW radio configured to establish a mmW connection with a node in the mmW mesh network, and a pole mount component coupled with a first section of the radio component.

19 Claims, 17 Drawing Sheets

(56) References Cited

U.S. PATENT DOCUMENTS

| | | | |
|---|---|---|---|
| 2014/0146902 A1* | 5/2014 | Liu | H04B 7/0689 |
| | | | 375/260 |
| 2014/0225788 A1* | 8/2014 | Schulz | G06F 3/0482 |
| | | | 343/702 |
| 2014/0321282 A1 | 10/2014 | Pragada et al. | |
| 2015/0109943 A1 | 4/2015 | Sahin et al. | |
| 2015/0146532 A1 | 5/2015 | Stojanovski et al. | |
| 2015/0215839 A1 | 7/2015 | Johansson et al. | |
| 2015/0371571 A1* | 12/2015 | Hager | H04W 88/08 |
| | | | 348/552 |
| 2016/0330643 A1 | 11/2016 | Sahin et al. | |
| 2016/0337916 A1 | 11/2016 | Deenoo et al. | |
| 2016/0359224 A1 | 12/2016 | Mellor | |
| 2017/0265190 A1 | 9/2017 | Marjelund et al. | |
| 2018/0084513 A1 | 3/2018 | Sheashua et al. | |
| 2018/0115958 A1 | 4/2018 | Raghavan et al. | |

* cited by examiner

MESH TOPOLOGY RADIO

CROSS REFERENCES

The present application is a continuation in part of U.S. patent application Ser. No. 15/603,804, entitled "Mesh Topology Radio," filed May 24, 2017. The disclosure of which is incorporated by reference herein in its entirety.

BACKGROUND

The following relates generally to wireless communication, and more specifically to a mesh topology radio.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a WLAN, such as a Wi-Fi (i.e., Institute of Electrical and Electronics Engineers (IEEE) 802.11) network may include an access point (AP) that may communicate with one or more nodes. The AP may be coupled to a network, such as the Internet, and may enable a node to communicate via the network (or communicate with other devices coupled to the access point). A node may communicate with a network device bi-directionally. For example, in a WLAN, a node may communicate with an associated AP via downlink and uplink. The DL (or forward link) may refer to the communication link from the AP to the node, and the UL (or reverse link) may refer to the communication link from the node to the AP.

A node, which may be an AP, may provide services and resources for a given coverage area that may include one or more nodes. The node may manage resources assigned to other nodes. For example, a node may manage uplink and downlink resources for each other nodes. Some wireless communication systems, however, lack the capability to form an efficient and robust network or may require complex coordination to provide services and resources to the other nodes within the given coverage area.

SUMMARY

The described techniques relate to improved methods, systems, devices, or apparatuses that support mesh topology radio communications. Generally, the described techniques relate to a network, devices, and a device architecture that provides improved network coverage and site acquisition. In addition, the network and device architecture offers cost-effective, efficient fixed wireless service.

In one aspect, the network and device architecture enables site acquisition problems to be solved using an infrastructure-less deployment. The device architecture may include a wired communication interface that establishes a connection with an access point (AP) having a dedicated connection with a core network. Additionally, the device architecture may include multiple radios for establishing connections of one or more types with other nodes in a network. For example, a node with the device architecture described according to aspects of the present disclosure may have a first radio that establishes a millimeter wave (mmW) connection with another node in a network. The node may also establish another mmW connection with a different node in a different network segment (e.g., mesh segment) using a second radio. In some cases, the node may be configured with a radio to establish a cellular connection with other nodes in the network.

The device architecture may also be or implemented in equipment installed on end-user homes that connects with other end-user homes to form a mesh network. As a result, the following relates to a mesh network architecture. The mesh network may include redundant, resilient connectivity using various nodes without a need for acquiring number of sites to support the mesh network.

An apparatus for wireless communication is described. The apparatus may include a processor; memory in electronic communication with the processor; a wired communication interface, in electronic communication with the processor, to establish a first connection with an access point having a dedicated connection with a core network; a first radio, in electronic communication with the processor, to establish a first mmW (mmW) connection with a first node of a mmW mesh network; and a second radio, in electronic communication with the processor, to establish a second mmW connection with a second node of the mmW mesh network.

Some examples of the apparatus described above may further include a third radio, in electronic communication with the processor, to establish a cellular connection with the first node or the second node of the mmW mesh network. Some examples of the apparatus described above may further include two or more baseband circuits in electronic communication with the second radio and the third radio, and one or more radio frequency integrated circuits to provide a plurality of radio sectors for the mmW mesh network.

In some examples of the apparatus described above may further provide a point-to-point connection or a point-to-multipoint connection using one or more radio sectors corresponding to the first mmW connection, or the second mmW connection, or both. In some examples of the apparatus described above the first node and the second node are connected to a third node, wherein the first mmW connection and the second mmW connection comprise alternative connections from the third node to the access point having the dedicated connection with the core network.

In some examples of the apparatus described above the first radio, the second radio, and the third radio are contained within a single housing. In some examples of the apparatus described above the first node and the second node are a same node, and wherein the apparatus is configured to identify that the first node and the second node are the same node and communicate with the same node using the second radio or the third radio based on the identification. In some examples of the apparatus described above the third radio comprises a plurality of input ports, the apparatus being configured to combine a number of input ports that are each associated with different carriers.

A method for wireless communication is described. The method may include establishing, using a wired interface, a first connection with an access point having a dedicated connection with a core network; establishing, using a first radio of a plurality of radios, a first mmW connection with a first node of a mmW mesh network; and establishing, using a second radio of the plurality of radios, a second mmW connection with a second node of the mmW mesh network.

Another apparatus for wireless communication is described. The apparatus may include means for establishing, using a wired interface, a first connection with an access point having a dedicated connection with a core network; means for establishing, using a first radio of a plurality of radios, a first mmW connection with a first node of a mmW mesh network; and means for establishing, using a second radio of the plurality of radios, a second mmW connection with a second node of the mmW mesh network.

Another apparatus for wireless communication is described. The apparatus may include a processor, memory in electronic communication with the processor. The processor and memory configured to establish, using a wired interface, a first connection with an access point having a dedicated connection with a core network; establish, using a first radio of a plurality of radios, a first mmW connection with a first node of a mmW mesh network; and establish, using a second radio of the plurality of radios, a second mmW connection with a second node of the mmW mesh network.

A non-transitory computer readable medium for wireless communication is described. The non-transitory computer-readable medium may include instructions operable to cause a processor to establish, using a wired interface, a first connection with an access point having a dedicated connection with a core network; establish, using a first radio of a plurality of radios, a first mmW connection with a first node of a mmW mesh network; and establish, using a second radio of the plurality of radios, a second mmW connection with a second node of the mmW mesh network.

Some examples of the method, apparatus, and non-transitory computer-readable medium described above may further include processes, features, means, or instructions for establishing, using a third radio of the plurality of radios, a cellular connection with the first node or the second node of the mmW mesh network.

Some examples of the method, apparatus, and non-transitory computer-readable medium described above may further include processes, features, means, or instructions for receiving configuration information associated with the mmW mesh network from a central configuration server, wherein establishing the first mmW connection, the second mmW connection, the cellular connection, or a combination thereof is based at least in part on the received configuration information.

Some examples of the method, apparatus, and non-transitory computer-readable medium described above may further include processes, features, means, or instructions for identifying the first node or the second node, or both based at least in part on the configuration information. In some examples of the method, apparatus, and non-transitory computer-readable medium described above, establishing the first mmW connection with the first node or the second mmW connection with the second node, or both is based at least in part on a node identifier (ID) of the first node or the second node, or both received in the configuration information.

In some examples of the method, apparatus, and non-transitory computer-readable medium described above, the configuration information comprises a type of connection to establish, a frequency associated with the type of connection to establish, or a node identifier (ID) identifying a node to connect with in the mmW mesh network, or a combination thereof. In some examples of the method, apparatus, and non-transitory computer-readable medium described above, the type of connection comprises a Long Term Evolution (LTE) connection, a Wi-Fi connection, a mmW connection, or a combination thereof.

In some examples of the method, apparatus, and non-transitory computer-readable medium described above, establishing the first mmW connection, the second mmW connection, the cellular connection, or a combination thereof is based at least in part on an autonomous self-configuration.

Some examples of the method, apparatus, and non-transitory computer-readable medium described above may further include processes, features, means, or instructions for identifying a failure of the first mmW connection with the first node of the mmW mesh network; and communicating with the first node using the second mmW connection with the second node or a connection associated with a third node based at least in part on the failure, wherein the connection associated with the third node comprises a mmW connection or a cellular connection, or both.

Some examples of the method, apparatus, and non-transitory computer-readable medium described above may further include processes, features, means, or instructions for analyzing a topology of the mmW mesh network based at least in part on a change in a connection with the first node, wherein the change in the connection is associated with the identified failure of the first mmW connection; and identifying an update to the topology of the mmW mesh network based at least in part on the analysis. In some examples of the method, apparatus, and non-transitory computer-readable medium described above, the second node and the third node are in communication with the first node, wherein the second mmW connection with the second node and the connection with the third node comprise alternative connections with the core network for the first node. Some examples of the method, apparatus, and non-transitory computer-readable medium described above may further include processes, features, means, or instructions for identifying that the first node is connected to a core network, wherein establishing the first mmW connection comprises establishing a point-to-point connection with the first node.

Some examples of the method, apparatus, and non-transitory computer-readable medium described above may further include processes, features, means, or instructions for aggregating at least two carriers using a non-contiguous mode by combining a first subset of input ports that correspond to multiple carriers and combining a second subset of input ports that correspond to the multiple carriers; linking at least channels of a radio frequency band based at least in part on the aggregation; and providing a channel bandwidth for establishing the cellular connection with the first node or the second node of the mmW mesh network is based at least in part on the linking, wherein the established cellular connection is based at least in part on the channel bandwidth.

Some examples of the method, apparatus, and non-transitory computer-readable medium described above may further include processes, features, means, or instructions for determining a resource utilization of a radio frequency spectrum associated with the first mmW connection for transmitting subscriber data traffic to the first node; segregating subscriber data traffic intended for transmission to the first node based at least in part on the determined resource utilization; and identifying a transmission path of the segregated subscriber data traffic, wherein the transmission path comprises the first mmW connection, the second mmW connection, or the cellular connection, or any combination thereof.

Some examples of the method, apparatus, and non-transitory computer-readable medium described above for identifying the transmission path is based at least in part on an autonomous routing protocol or a performance metric, or both may further include processes, features, means, or instructions for receiving scheduling and routing information associated with one or more transmission intervals and whether to transmit subscriber data traffic during the one or more transmission intervals using one or more different connection types, wherein the one or more connections types comprises the first mmW connection, the second mmW connection, or the cellular connection, or any combination thereof.

An apparatus for wireless communication in a mesh network is described. The apparatus may include a processor; memory in electronic communication with the processor; a first radio component including a plurality of mmW radios in electronic communication with the processor, each mmW radio configured to establish a mmW connection with a node in the mesh network, a connection component positioned on a lower surface of the first radio component, and a pole component coupled with the first radio component via the connection component, the pole component housing a second radio component including a cellular radio, the second radio component in electronic communication with the processor.

In some examples of the apparatus described above, the cellular radio is positioned within a cavity of the pole component. In some examples of the apparatus described above, the pole component has a uniform cross section. In some examples of the apparatus described above, the pole component has a circular cross section.

In some examples of the apparatus described above, the cellular radio is configured to establish a cellular connection with the node in the mesh network. In some examples of the apparatus described above, the cellular radio is a Long-Term Evolution (LTE) radio.

In some examples of the apparatus described above, the processor is configured to initiate operation of at least one mmW radio of the plurality of mmW radios in a first power mode and the cellular radio in a second power mode, the first power mode being different from the second power mode.

Some examples of the apparatus described above may further include a baseband device in electronic communication with the processor, and a radio frequency integrated circuit (RFIC) in electronic communication with the baseband device and the first radio component or the second radio component, or both.

In some examples of the apparatus described above, the processor is configured to operate at least one mmW radio of the plurality of mmW radios during a first duration and the cellular radio during a second duration based at least in part on a configuration of the apparatus, the first duration being non-overlapping with the second duration. In some examples of the apparatus described above, the processor is configured to operate at least one mmW radio of the plurality of mmW radios and the cellular radio concurrently based at least in part on the at least one mmW radio operating on a channel different from the cellular radio. In some examples of the apparatus described above, the pole component is coupled to a base component installed on a structure.

Another apparatus for wireless communication is described. The apparatus may include a processor; memory in electronic communication with the processor; a mmW radio, in electronic communication with the processor, to establish a beamformed connection at a first time based at least in part on an operating parameter associated with the apparatus; and a radio, in electronic communication with the mmW radio, to establish a connection different from the beamformed connection at a second time based at least in part on a change of the operating parameter.

In some examples of the apparatus described above, the mmW radio and the radio are contained within a single housing of the apparatus, and the single housing of the apparatus including a first portion and a second portion that is coupled with the first portion. In some examples of the apparatus described above, the first portion is orthogonal to the second portion. In some examples of the apparatus described above, the first portion and the second portion are coupled using a connection component positioned on a lower surface of the first portion.

In some examples of the apparatus described above, the first portion has a length that extends in a first direction, the length being greater than a width of the first portion, and the second portion has a length that extends in a second direction different from the first direction, the length being lesser than a width of the second portion. In some examples of the apparatus described above, the radio is positioned within a cavity of the second portion.

Another method for wireless communication at node is described. The method may include establishing, using a mmW radio of the node, a beamformed connection with a second node in a mmW mesh network based at least in part on a first radio resource control (RRC) connection procedure; determining a change in an operating parameter associated with the beamformed connection; and establishing, using a cellular radio contained within a cavity of a pole component of the node, a cellular connection with the second node based at least in part on a second RRC connection procedure.

Some examples of the method, apparatus, and non-transitory computer-readable medium described above may further include processes, features, means, or instructions for releasing the beamformed connection between the node and the second node based at least in part on the change in the operating parameter. In some examples of the method, apparatus, and non-transitory computer-readable medium described above, the operating parameter comprises a measured channel status indicator (CSI), a channel quality indicator (CQI), a received signal strength indicator (RSSI), a quality of service (QoS), a signal to noise ratio (SNR), or any combination thereof.

Another apparatus for wireless communication in a mmW mesh network is described. The apparatus may include a processor; memory in electronic communication with the processor; a radio component including a plurality of mmW radios in electronic communication with the processor, each mmW radio configured to establish a mmW connection with a node in the mmW mesh network, and a pole component coupled with a first section of the radio component.

In some examples of the apparatus described above, the plurality of mmW radios are enclosed within a single housing of the radio component. In some examples of the apparatus described above, the first section is positioned at a centric location on a lower surface of the radio component and includes a connection component. In some examples of the apparatus described above, the pole component being coupled with the connection component.

In some examples of the apparatus described above, the pole component is coupled with the connection component using a single bolt C-clamp. Some examples of the apparatus described above may further include a fastener that secures the single bolt C-clamp with the pole component. In some examples of the apparatus described above, the fastener includes a screw.

Some examples of the apparatus described above may further include a plurality of flanges positioned proportionally and distributed circumferentially around the radio component. In some examples of the apparatus described above, the plurality of mmW radios or the plurality of flanges, or both are configured to be modular. In some examples of the apparatus described above, the plurality of flanges extend across a lower surface of the radio component.

In some examples of the apparatus described above, at least one of the flanges is coupled with a global position system (GPS) and Wi-Fi component. In some examples of the apparatus described above, the GPS and Wi-Fi component is configured with a light-emitting diode (LED). In some examples of the apparatus described above, the LED is configured to indicate an installation status, or a service code, or both.

Some examples of the apparatus described above may further include a cover component configured as a heat shield for the radio component. In some examples of the apparatus described above, the cover component is coupled with an upper surface of the radio component, the cover component being made up of a ultra-violet high rating material. Some examples of the apparatus described above may further include a handle component positioned and attached to a surface of the cover component.

In some examples of the apparatus described above, the plurality of mmW radios are positioned proportionally and distributed circumferentially around the radio component. In some examples of the apparatus described above, the radio component has a length that extends in a first direction, the length being greater than a width of the radio component. In some examples of the apparatus described above, the pole component extends in a second direction different from the first direction. In some examples of the apparatus described above, the first direction is orthogonal to the second direction.

Another apparatus for wireless communication is described. The apparatus may include a processor; memory in electronic communication with the processor; a radio component including a plurality of mmW radios in electronic communication with the processor, each mmW radio configured to establish a mmW connection; a cover component coupled with an upper surface of the radio component; a pole component coupled with a connection component positioned on a lower surface of the radio component, wherein the pole component is coupled with the connection component using a single connecter; and a plurality of flanges positioned proportionally and distributed circumferentially around the radio component.

In some examples of the apparatus described above, at least one of the flanges is coupled with a GPS and Wi-Fi component.

Another apparatus for wireless communication is described. The apparatus may include a processor; memory in electronic communication with the processor; a radio component including at least two mmW radios, in electronic communication with the processor, each configured to establish a mmW connection, wherein the at least two mmW radios are distributed circumferentially around the radio component; a pole component including a first end and a second end: the first end being coupled with a connection component positioned on a first side of the radio component; and the second end being coupled with a base component configured to be installed on a structure.

In some examples of the apparatus described above, the first end is coupled with the connection component using a first fastener type and the second end is coupled with the base component using a second fastener type that is different from the first fastener type.

DETAILED DESCRIPTION

Figure 1:
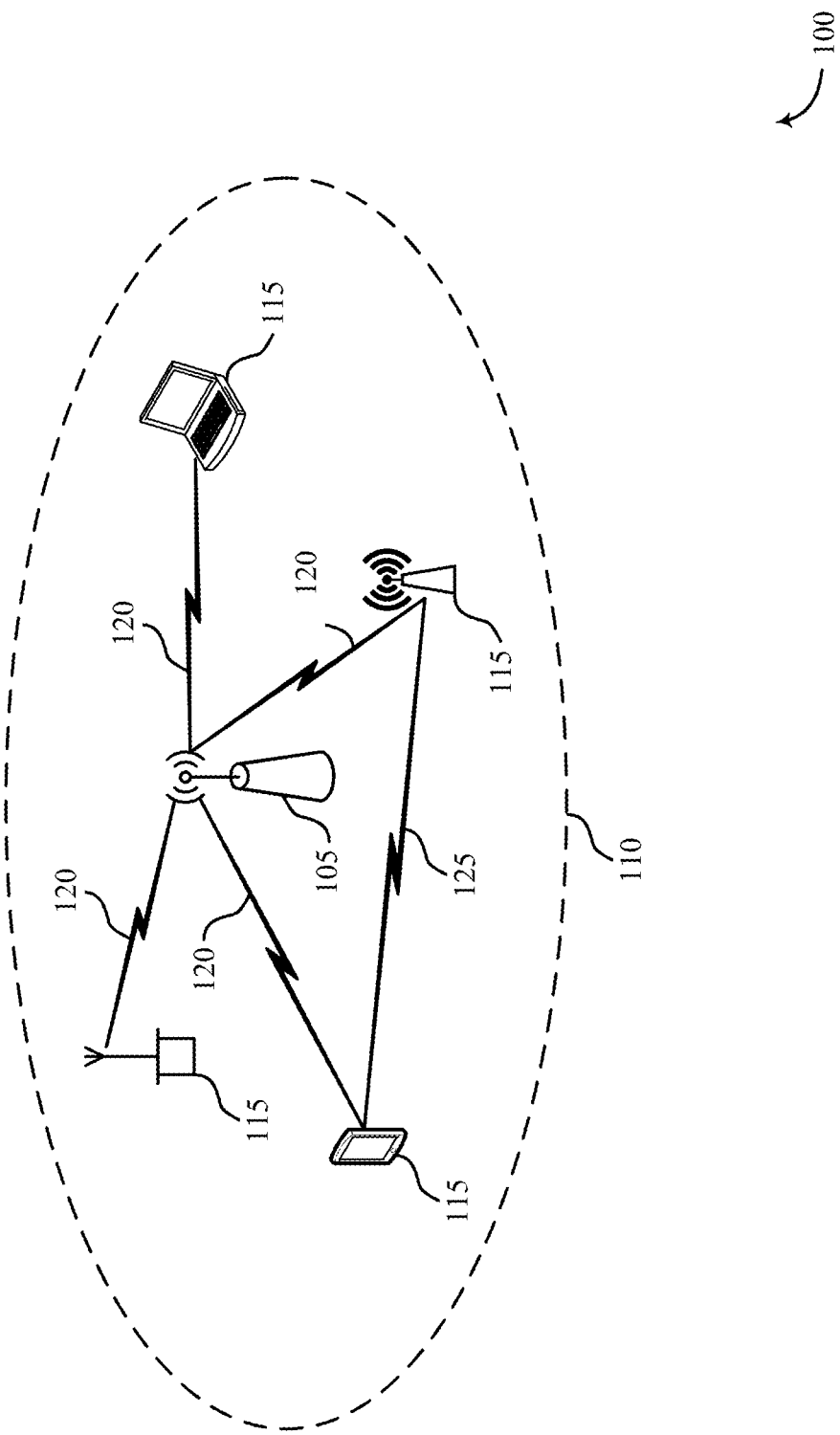
FIG. 1 illustrates an example of a system for wireless communication that supports mesh topology radio communications in accordance with aspects of the present disclosure.

Some communication systems include communication between base stations and client terminals. A base station may provide services and resources for a given geographic coverage area (e.g., a cell), which may include one or more client terminals. The base stations may manage resources assigned to each client terminal. For example, a base station may manage uplink and downlink resources for each client terminal in a given cell. Some communication systems, however, lack the capability to form an efficient and robust network in the absence of complex configuration information, and these systems instead require centralized configuration information distribution.

Further, broadband connections offered in some communication systems may be provided to client terminals via both wireless and wireline connections. In one aspect, broadband connections may utilize existing copper (xDSL) or coax (DOCSIS) wirelines to connect to client terminals within a home. Alternatively, some communication systems may deploy fiber (GPON) directly or indirectly to homes or nodes to enable an increase in capacity of broadband connections (e.g., VDSL, G.fast). However, providing broadband connections via xDSL, DOCSIS, or GPON may result in expensive deployments. For example, fiber deployment incurs high implementation costs for new entrant internet service providers (ISP) with no existing network infrastructure. One challenge faced by entrant wireless broadband providers, e.g., cellular mobile network operators or various wireless ISPs is site acquisition. The need to improve site acquisition becomes more evident in cases related to fixed wireless applications. In these cases, client demand for network usage of devices within a home may be greater compared to mobile devices.

Some communication systems have implemented a small cell model. In the small cell model, sites are deployed on non-traditional locations to improve network capacity (e.g., increase both million bits per second (Mbps) per square-mile and to reduce cost per Mbps or Mbyte). Although the small cell model improves network coverage to some degree, it has not solved the problem of site acquisition and instead creates additional problems. There exists a need to improve techniques for providing network connections to client terminals using new radio devices. In order to provide wireline capacity and end-user experience, the network capacity may be higher compared to a mobile broadband network. As a result, more of the network spectrum, which is constrained by resources, needs to be acquired.

The present disclosure provides a network, devices, and a device architecture that provides improved network coverage and site acquisition. In addition, the network, the devices, and the device architecture offers consumers a cost-effective multi-Gbps fixed wireless service at a net customer acquisition cost that is lower compared to fiber network deployments or mobile cellular network deployments. In one aspect, the network and device architecture enables the site acquisition problem to be solved using an infrastructure-less deployment based on using various nodes to provide distinct functions. That is, equipment installed at end-users units (e.g., homes, buildings, offices) connects with other end-user units to form a mesh network without the need for complex, centralized configuration.

The mesh network may include redundant, robust connectivity without having to acquire a specific number of sites to support the mesh network. In some cases, the mesh network may be a Wi-Fi mesh network, or a millimeter wave (mmW) mesh network, or both. For example, the mesh network may include and operate in the mmW spectrum in conjunction with traditional lower frequency (e.g., less than 6 GHz) spectrum. The mmW spectrum may utilize usage of higher frequency bands e.g., up to 24 GHz or even more, for carrying a portion of user traffic data toward a core network. As a result, the mesh network becomes a resilient, high capacity network that delivers cost effective multi-Gbps connections to subscribers without the use of traditional sites. Hence, the mesh network overcomes the traditional site acquisition challenge and provides other added benefits.

The mesh network may, additionally or alternatively, include equipment installed and located at an end-user's home (e.g., a node) to provide connectivity, which may form the mesh network with equipment installed and located at other end-user's homes (e.g., other nodes). In some cases, the mesh network may include a threshold number of nodes (i.e., end-user's homes) such that traditional site acquisition may be avoided. In some cases, a subset of the end-user homes within a mesh segment of the mesh network may include a dedicated connection to a core network. The dedicated connection to the core network may be or include a fiber connection or a dedicated high-capacity wireless link to a traditional site (e.g., base station tower).

The mesh network may include a homogenous set of nodes that may form a contingent mesh network. A node in the mesh network may be aware as to whether it is connected to a core network using one or more connections (e.g., a wired connection, a wireless connection). Further, a node may be visible to other nodes in the mesh network based on broadcasting one or more signals (e.g., beacons). The node may also respond to signals from other nearby nodes. Once a node receives a signal from another node it may acknowledge and characterize a quality of a potential communication link between itself and the other node. For example, the quality of the potential communication link may be based on a signal strength associated with the received signal.

In some cases, the mesh network may include a subset of nodes that may, in addition to the connection to the core network, include equipment that provides a broadband connection component (e.g., LTE eNodeB component). The broadband connection component may include one or more radios that enable connections with nodes that lack capability to establish mmW connections. In some examples, the broadband connection component may be an optional component associated with a node. The broadband connection component may also ensure contiguous coverage over a mesh network.

In some examples of the device architecture related to the mesh network, the nodes may be a 60 GHz Wi-Fi capable node that includes a single high performance, low cost, low power network processor unit. The low power network processor unit may connect to two or more baseband devices (e.g., 802.11ad baseband devices). The two or more baseband devices may connect to one or more radio frequency integrated circuit (RFIC) that are combined with antennas to provide a fully integrated radio and antenna component. As a result, the node may provide a range of coverage. For example, the mesh node may provide up to a 360 degree coverage (e.g., azimuth coverage). The mesh node may provide this coverage using two or more mesh sectors, each mesh section may support either a single point-to-point connection to another mesh node in the mesh network. Additionally, the mesh node may provide up to a 360 degree coverage using a plurality of mmW wave radios in electronic communication with the processor unit. For example, the mesh node may have multiple (e.g., at least four) mmW radios each providing various coverage (e.g., approximately 90 degree coverage). In addition, the mmW radios may provide a vertical coverage phased array (e.g., plus or minus six degrees) for supporting giga-byte (GB) speed backhaul. In some cases, the plurality of mmW wave radios may be enclosed in a single housing (e.g., unit). In some cases, the plurality of mmW wave radios may each be enclosed in different housings (e.g., different units).

A mesh sector may include a mesh network of a collection of mesh sectors with each including one or more mesh nodes. Alternatively, the mesh sector may support a connection to multiple nodes through point-to-multipoint connection. A node of the mesh network may, additionally or alternatively, have broadband connection capability i.e., may include the LTE eNB component that provides coverage to other nodes in the mesh network that do not support 60 GHz Wi-Fi connections.

The broadband connection component may provide wide-area coverage within a neighborhood of nodes to form a neighborhood area network (NAN). The NAN may provide options for a network coverage option. For example, some nodes of the mesh network may request a low cost Mbps service (e.g., 50-100 Mbps). This may be provided by an indoor customer premise equipment (CPE). The CPE may additionally provide network connection and coverage for mobile devices in range of the node. In some cases, the CPE may be located inside a node or external to a node. For instance, interior located CPEs may be used for nodes that are close to another node, that supports a device with a broadband coverage. Alternatively, exterior located CPEs may be used for nodes that are further apart from another node. An external located CPE may provide a combination of increased coverage and interference rejection because of the increase of directivity of the radio. As a result, the above described mesh network results in a 60 GHz multi-Gbps mesh network that provides Gbps service directly to nodes without the need for extensive site acquisition The nodes of the mesh network may also form a number of point-to-multipoint connections or mesh clusters that may be interconnected at each node to form a mesh segment. In some examples, the mesh network may use VxLAN overlay networking to segregate subscriber traffic and enable traffic handling that scalable to large mesh network sizes. The mesh nodes may also use IPv6 and a combination of link local and stateless link auto configuration (SLACC) to prevent address pre-configuration. In some cases, the nodes of the mesh network may use open shortest path first (OSPF). The nodes may in some cases use centralized configuration of routing tables to override OSPF based on conditions of the mesh network.

In some cases, the mesh network may initiate communication with a first tower (e.g., base station eNB) or rooftop site being deployed. The first tower may provide services (e.g., subscriber services, data) to a first node of the mesh network a connection to a core network. Once the first tower and the first node are connected, the first node may provide one or more network coverage options to one or more other nodes that join the mesh network. For example, the first node may provide a 60 GHz network connection option (e.g., via a line-of-sight (LOS) connection with the first tower) or an LTE eNB (e.g., through LOS and/or non-line-of-sight (NLOS)) connection.

Scheduling modems associated with a node in the mesh network may be deployed in a distributed manner, e.g., using carrier sense multiple access (CSMA). In this case, the 60 GHz modems may sense utilization of a radio medium (e.g., bandwidth, channel usage) and determine when the radio medium is available. As a result, this overcomes the need for a centralized synchronization of timing and coordination of time and frequency resource allocation. Further routing and scheduling may be controlled in a centralized manner for any number of nodes in the mesh network. For example, in any one mesh segment of the mesh network, one or more nodes may have a topology function controlled centrally via the configuration service. Alternatively, the one or more nodes may receive routing parameters through software defined networking (SDN). The nodes may also receive additional parameters that regulate resources related to transmission and reception of data between the nodes.

Aspects of the disclosure are initially described in the context of a wireless communications system. Exemplary wireless devices (e.g., STAs, nodes) network wireless devices (e.g., APs), systems, and methods that support mesh topology radio communications are then described. Aspects of the disclosure are further illustrated by and described with reference to apparatus diagrams, system diagrams, and flowcharts that relate to mesh topology radios. The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a system 100 for wireless communication that supports mesh topology radio communications in accordance with aspects of the present disclosure. System 100 in some examples may be or include a wireless local area network (WLAN) (also known as a Wi-Fi network) configured in accordance with various aspects of the present disclosure. In some examples, the system 100 may also be or include a Long Term Evolution (LTE), LTE-Advanced (LTE-A) network, or a New Radio (NR) mesh network. In some examples, the system 100 may be a mesh network with least two pathways to each node, forming a net-like organization. When each node is connected to every other node, the network is said to be fully meshed. When only some of the nodes are linked, switching is required to make all the connections and the network is said to be partially meshed, or partially connected. In some cases, the system 100 may support enhanced broadband communications, low latency communications, and communications with low-cost and low-complexity devices.

The system 100 may include an AP 105 and multiple associated nodes 115. In some cases, the nodes 115 may represent wireless devices such as device containing a plurality of radios (e.g., 2 radios, 4 radios), mobile stations, user equipments, personal digital assistant (PDAs), other handheld devices, netbooks, notebook computers, tablet computers, laptops, display devices (e.g., TVs, computer monitors), printers, etc. The AP 105 and the associated nodes 115 may represent a basic service set (BSS) or an extended service set (ESS). The various nodes 115 in the network are able to communicate with one another through the AP 105. Also shown is a coverage area 110 of the AP 105, which may represent a basic service area of the system 100. An extended network station (not shown) associated with the system 100 may be connected to a wired or wireless distribution system that may allow multiple APs 105 to be connected in an ESS.

In some examples, the system 100 may include a homogenous set of the nodes 115 that form a contingent mesh network. Each node 115 in the system 100 may be aware as to whether it is connected to a core network (e.g., through AP 105). For example, AP 105 may be connected to a core network through a wired connection. The nodes 115 may include a wired communication interface to establish a connection with the AP 105 having a dedicated connection to a core network. In some cases, the nodes 115 may determine whether they are connected to the core network based on a higher layer ping function. In some cases, the nodes 115 of the system 100 may be visible to each other based on broadcasting signals. The nodes 115 may also respond to received signals from other nodes 115.

The core network (not shown in FIG. 1) may provide user authentication, access authorization, tracking, Internet Protocol (IP) connectivity, and other access, routing, or mobility functions. In some configurations, various functions of each access network entity or AP 105 may be distributed across various nodes (e.g., radio heads and access network controllers) or consolidated into a single network device (e.g., the AP 105).

The nodes 115 may establish a number of connections with other nodes 115. For example, each node may include multiple radios (e.g., two or more mmW radios, one or more cellular radios). A node 115 may establish a first mmW connection with another node 115 in the system 100 using a radio. Additionally or alternatively, the node 115 may establish a second mmW connection with a different node 115 in the system 100 using a different radio. The node 115 may also in some cases, establish a cellular connection with a node using a cellular radio. In some examples, a plurality of radios of the nodes 115 may be contained within a single housing. In some examples, the nodes 115 may include two or more baseband circuits in electronic communication with one or more radios. The nodes 115 may in addition, include one or more RFICs to provide a plurality of radio sectors for a mmW mesh network. The nodes 115 may provide a point-to-point connection or a point-to-multipoint connection to other nodes 115 using the one or more radio sectors.

The nodes 115 in some cases may acknowledge and characterize a quality of a communication link with one or more other nodes (e.g., wireless link 120 or wireless link 125). In some examples, the nodes 115 may request a connection with a number of neighboring nodes 115, to establish and monitor the connection with the number of neighboring nodes 115. Each node 115 may identify available radio frequency resources to use for establishing connections with other neighboring nodes 115. The nodes 115 may also maintain a number of connections to other neighboring nodes 115. For example, a node 115 may be assigned a predetermined number of connections (e.g., to at least two or more nodes).

In some cases, a mmW mesh network may include a subset of nodes that may, in addition to a connection to a core network, include equipment that provides a broadband connection component (e.g., LTE eNodeB component). The broadband connection component may include one or more radios that enable two carriers to be aggregated non-contiguously. The system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A node 115 may be configured with multiple downlink CCs and one or more uplink CCs for carrier aggregation. Carrier aggregation may be used with both frequency division duplexing (FDD) and time division duplexing (TDD) component carriers.

In some cases, the system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by the nodes 115 that are not capable of monitoring the whole bandwidth or prefer to use a limited bandwidth (e.g., to conserve power).

In some cases, the system 100 may include a subset of the nodes 115 that may, in addition to a connection to a core network, include equipment that provides a broadband connection component (e.g., LTE 4G eNodeB component). The broadband connection component may include one or more radios (e.g., steerable antennas) that enable two carriers to be aggregated non-contiguously. The two carriers may support two adjacent or non-adjacent channels. In some cases, to overcome the loss associated with conductive combining of two carriers within the node 115, a simple diplexer may be used. Alternatively, in cases where the diplexer may not be used, over the air combining may be performed. Each carrier may have two ports to support two-by-two MIMO, e.g., multiple radios may have four input ports. The broadband connection component may ensure contiguous coverage over the system 100 (i.e., a mesh network). The broadband connection component of the nodes 115 may provide omni-like coverage for one or more carriers. Omni-like coverage may be provided by air combining two vertically polarized ports for a first carrier and a second carrier. Similarly, the two horizontal polarized ports may be air combined. In some cases, the radios of the nodes 115 may have a cavity in the middle. This may enable the cabling of the broadband connection component to be wired through the middle of the one or more radios.

Existing nodes 115 in the system 100 may also broadcast signals. The signals may include configuration data for nodes seeking to join a mesh network (e.g., mmW mesh network). The existing nodes 115, in some examples, may be seed nodes with a connection to a core network. For example, in mesh networks a seed node may have a physically wired or wireless connection to a network connection (e.g., DSL). The seed node may share its connection to the core network with other existing neighboring nodes in the mesh network.

In some cases, a seeking node 115 may receive the broadcasted signals. Based on receiving the signal, the seeking node 115 may discover existing nodes in a mesh network that are associated with the received signals. In some examples, the seeking node 115 may establish a connection with an existing node 115 corresponding to a first received signal. For example, a first node may broadcast a first signal and a second node may broadcast a second signal. Both the first node and the second node may be existing nodes in the mesh network. A seeking node looking to join the mesh network may receive the first signal before receiving the second signal. As a result, the seeking node may establish a connection with the first node based on the received signal.

Seeking nodes searching to join a mesh network may evaluate received signals to determine which corresponding node to initiate a connection with. Evaluation, in some examples, may be determined based on one or more rules applied to a received signal. One rule for example may require that received signal be within a threshold of a received signal strength indicator (RSSI) value. In some examples, a seeking node may alternatively receive a second signal after the first signal. The second signal may satisfy the RSSI, while the first signal may not. As a result, the seeking node may initiate a connection with the second node instead of the first node based on the characteristic of the second signal (e.g., satisfying the RSSI). Additionally or alternatively, evaluation for potential node connection may be based on one or more performance indicators. A performance indicator may include throughput, latency, latency/throughput variance, redundancy, node connection due to node mobility, or a combination thereof. Thus, nodes may iteratively attempt a connection with other discoverable nodes in a mesh network. As a result, the mesh network may be formed recursively.

Although not shown in FIG. 1, a node 115 may be located in the intersection of more than one coverage area 110 and may associate with more than one AP 105. A single AP 105 and an associated plurality of nodes 115 may be referred to as a BSS. An ESS is a plurality of connected BSSs. A distribution system (not shown) may be used to connect APs 105 in an ESS. Although not shown in FIG. 1, the system 100 may include forming a number of unique personal basic service sets (PBSSs) or InfraBSSs. Additionally, the PBSSs or InfraBSS may be meshed. For example, a first PBSS and a second PBSS may be meshed (e.g., linked, overlap) based on meshing at a network layer (e.g., layer 3). In some cases, the coverage area 110 of the AP 105 may be divided into sectors (also not shown). The system 100 may include APs 105 of different types (e.g., metropolitan area, home network, etc.), with varying and overlapping coverage areas 110.

Two nodes 115 may also communicate directly via a direct wireless link regardless of whether both nodes 115 are in the same coverage area 110. Examples of direct wireless links may include Wi-Fi Direct connections, Wi-Fi Tunneled Direct Link Setup (TDLS) links, and other group connections. Nodes 115 and APs 105 may communicate according to the WLAN radio and baseband protocol for physical and medium access control (MAC) layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within the system 100.

In some cases, a node 115 (or an AP 105) may be detectable by a central AP 105, but not by other nodes 115 in the coverage area 110 of the central AP 105. For example, one node 115 may be at one end of the coverage area 110 of the central AP 105 while another node 115 may be at the other end. Thus, both nodes 115 may communicate with the AP 105, but may not receive the transmissions of the other. This may result in colliding transmissions for the two nodes 115 in a contention based environment (e.g., CSMA/CA) because the nodes 115 may not refrain from transmitting on top of each other. A node 115 whose transmissions are not identifiable, but that is within the same coverage area 110 may be known as a hidden node. CSMA/CA may be supplemented by the exchange of an request-to-send (RTS) packet transmitted by a sending node 115 (or AP 105) and a clear-to-send (CTS) packet transmitted by the receiving node 115 (or AP 105). This may alert other devices within range of the sender and receiver not to transmit for the duration of the primary transmission. Thus, RTS/CTS may help mitigate a hidden node problem.

The system 100 may, additionally or alternatively, operate in an ultra-high frequency (UHF) frequency region using frequency bands from 700 MHz to 2600 MHz (2.6 GHz), although some networks (e.g., a wireless local area network (WLAN)) may use different frequencies (e.g., 4 GHz), or free up more of the spectrum to use even higher frequencies (e.g., 4.2 GHz). This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to nodes 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some examples, the system 100 may use the CBRS band from 3.55 GHz to 3.7 GHz (e.g., for LTE communication). Additionally or alternatively, the system 100 may use the 5 GHz unlicensed band.

In some cases, the system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a node 115 (e.g., for directional beamforming). However, EHF transmissions may be subject to even greater atmospheric attenuation and shorter range than UHF transmissions.

Thus, the system 100 may support mmW communications between nodes 115 and AP 105. Devices operating in mmW or EHF bands may have multiple antennas to allow beamforming. That is, a AP 105 may use multiple antennas or antenna arrays to conduct beamforming operations for directional communications with a nodes 115. Beamforming (which may also be referred to as spatial filtering or directional transmission) is a signal processing technique that may be used at a transmitter (e.g., AP 105) to shape and/or steer an overall antenna beam in the direction of a target receiver (e.g., a node 115). This may be achieved by combining elements in an antenna array in such a way that transmitted signals at particular angles experience constructive interference while others experience destructive interference. Similarly, nodes 115 may individually use multiple antennas or antenna arrays to conduct beamforming operations for directional communications with a other nodes 115 or AP 105, or both. Additionally or alternatively, the system 100 may perform beamforming in the digital domain, analog domain, or both. In some examples, the application of beamforming may be performed in the analog domain at the radio frequency based on a large number of transmitters. In some cases, while the application of the beamforming weights may be performed in the analog domain, some processing to determine the beamforming weights may be performed in the digital domain.

MIMO wireless systems use a transmission scheme between a transmitter (e.g., a AP 105) and a receiver (e.g., a node 115), where both transmitter and receiver are equipped with multiple antennas. Some portions of the system 100 may use beamforming. For example, AP 105 may have an antenna array with a number of rows and columns of antenna ports that the AP 105 may use for beamforming in its communication with nodes 115, or vice versa. Signals may be transmitted multiple times in different directions (e.g., each transmission may be beamformed differently). A mmW receiver radio (e.g., a node 115) may try multiple beams (e.g., antenna subarrays) while receiving signals from AP 105 or other nodes 115.

Figure 2:
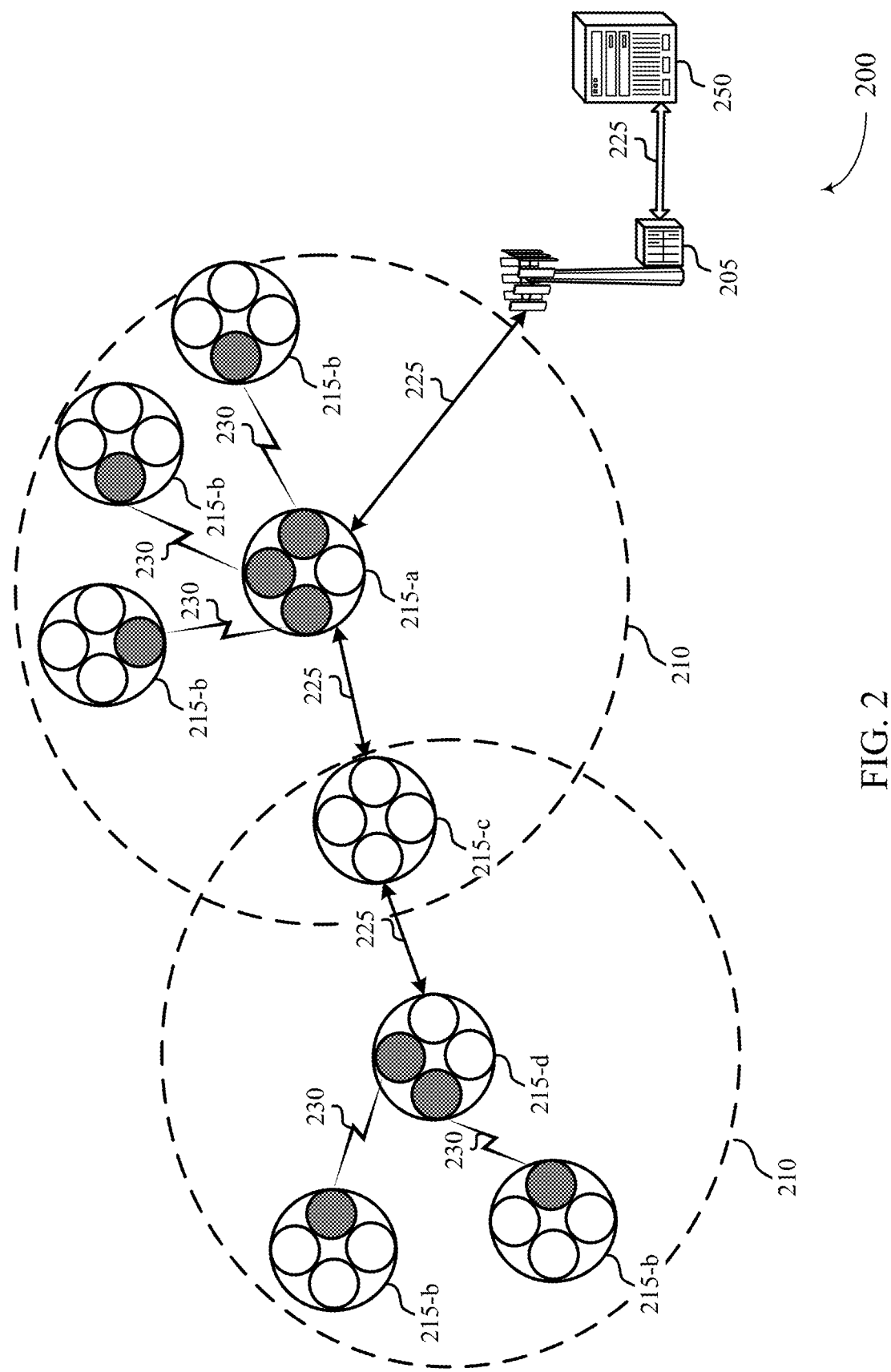
FIG. 2 illustrates an example of a system for wireless communication that supports mesh topology radio communications in accordance with aspects of the present disclosure.

FIG. 2 illustrates an example of a system 200 for wireless communication that supports mesh topology radio communications in accordance with aspects of the present disclosure. System 200 may be an example of one or more aspects of the system 100 of FIG. 1. System 200 may include node 215-a, node 215-b, node 215-c, and node 215-d, which may be or include one or more aspects of nodes 115 as described with reference to FIG. 1. One or more nodes 215 may be in direct or indirect communication with each other via communication links 225 or 230.

System 200 may offer a cost-effective multi-Gbps fixed wireless service at a net consumer acquisition cost that may be lower compared to a fiber network deployment or mobile cellular network deployment. In some cases, the network and node architecture of system 200 may enable site acquisition problem to be solved using an infrastructure-less deployment. Infrastructure-less deployment may include having equipment installed at end-user units (e.g., homes, buildings, offices) connect with other end-user units to form a mesh network. The mesh network may include redundant, robust connectivity without having to acquire a specific number of sites to support the mesh network. In some cases, the mesh network may be a Wi-Fi mesh network, or a mmW mesh network, or both. For example, the mesh network may include and operate in the mmW spectrum in conjunction with traditional lower frequency (e.g., <6 GHz) spectrum. The mmW spectrum may utilize usage of higher frequency bands e.g., up to 24 GHz or more, for carrying a portion of user traffic data toward a core network. The mesh network becomes a resilient, high capacity network that delivers cost effective multi-Gbps connections to subscribers without the use of traditional sites. Hence, the mesh network overcomes the traditional site acquisition challenge.

System 200 may be an example of two BSS within geographic coverage areas 210. The BSS of system 200 may, in some cases, also be an ESS. One or more nodes 215 of system 200 may connect to neighboring visible nodes 215. As such, a network where a node is visible to other neighboring nodes may be formed as a single BSS or become part of an ESS. System 200 may include forming a number of unique PBSSs or InfraBSSs.

Additionally, the number of unique PBSSs or InfraBSSs may be meshed using OSPF to interconnect each BSS. For example, a first PBSS and a second PBSS may be meshed (e.g., linked) based on meshing at a network layer (e.g., layer 3). The BSS may be coordinated by the node visible to other neighboring nodes. Node 215-a may be a BSS coordination point (e.g., a seed node). In some examples, as a BSS coordination point, node 215-a may have a connection to each of the nodes of system 200. For example, node 215-a may establish and maintain a connection with node 215-b and node 215-c. Additionally, node 215-a may coordinate connections between other nodes. For example, node 215-a may coordinate a connection between node 215-c and node 215-d. Node 215-a, node 215-b, node 215-c, and node 215-d, or any combination thereof may also be equipment installed on end-user homes which connect with other end-user homes to form a mesh network.

The mesh network may be or include redundant, resilient connectivity without having to obtain a number of sites to support the mesh network. In some cases, the mesh network may be a Wi-Fi mesh network or a mmW mesh network, or both. For example, one or more of the nodes 215 may operate in the mmW spectrum in conjunction with traditional lower frequency (e.g., <6 GHz) spectrum. The mmW spectrum may utilize usage of higher frequency bands. As a result, the mesh network becomes a robust, high capacity network that provides cost effective multi-Gbps connections to subscribers without the user of traditional sites.

Node 215-a, node 215-b, node 215-c, and node 215-d, or any combination thereof, may be configured with a single high performance, low cost, low power network processor unit. The network processor unit may connect to two or more baseband devices (e.g., 802.11ad baseband devices). The two or more baseband devices may connect to one or more RFIC that are combined with antennas to provide a fully integrated radio and antenna component. As a result, node 215-a, node 215-b, node 215-c, and node 215-d, or any combination thereof may provide a range of coverage. For example, the node 215-a may provide up to a 360 degree coverage (e.g., in azimuth direction). Node 215-a may provide coverage using two or more mesh sectors (e.g., geographic coverage areas 210). In some examples, to provide a range of coverage, node 215-a, node 215-b, node 215-c, and/or node 215-d may include a plurality of antennas (e.g., mmW radios). Each radio may be configured to establish a mmW connection with a node (e.g., nodes 215). To provide up to a 360 degree coverage, the plurality of antennas may be positioned proportionally and distributed circumferentially relative to a radio component of node 215-a, node 215-b, node 215-c, and node 215-d. For example, at least some of node 215-a, node 215-b, node 215-c, and node 215-d may have multiple (e.g., at least four) mmW radios that may be positioned proportionally and distributed circumferentially. Each of the mmW radios may be configured to provide up to 90 degrees of coverage. As a result, the combined degree coverage of the mmW radios would provide up to 360 degree total coverage. In some cases, each of the mmW radios may be configured to be a vertical coverage phase array providing a range (e.g., −6 degrees to +6 degrees).

Geographic coverage areas 210 may support either a single point-to-point connection to another node (e.g., node 215-b connection to node 215-a). A mesh sector may include a mesh network of a collection of mesh sectors with each including one or more nodes (e.g., node 215-a, node 215-b, node 215-c, and node 215-d, or any combination thereof). Alternatively, the mesh sector may support a connection to multiple nodes through point-to-multipoint connection. For example, a point-to-multipoint connection may include node 215-a connections to AP 205, nodes 215-b, and node 215-c.

System 200 may include a predetermined number of customer's homes within a mesh segment that have dedicated connectivity back to the core network. The connectivity may be either a fiber connection or by using a dedicated high capacity wireless link back to a traditional site like a tower (AP) or building rooftop. AP 205 may provide node 215-a connection to core network 250. Core network 250 may provide configuration of the nodes 215, user authentication, access authorization, tracking, Internet Protocol (IP) connectivity, and other access, routing, or mobility functions. Once, AP 205 and node 215-a are connected, node 215-a may provide one or more network coverage options to one or more other nodes 215 that join the mesh network. For example, the node 215-a may provide a 60 GHz network and/or mmW connection option (via, line-of-sight (LOS) connection with the first tower) or an LTE eNB (through LOS and/or non-line-of-sight (NLOS)) connection.

Nodes 215 may be associated with different customers or same customers within geographic coverage areas 210. In some examples of system 200, select customers may in addition have equipment that contains an LTE (or equivalent) 4G eNodeB component integrated into the node on their house. This in return provides wide-area coverage within the neighborhood to form a Neighborhood Area Network (NAN). In some cases, the NAN may initially enable customers that only want a low cost Mbps service (e.g. 50-100 Mbps) to be supported by providing an indoor CPE, indoor CPE with inside window mount antenna or external CPE.

Additionally or alternatively, system 200 may support CPEs to be integrated into mobile handsets, and will as such also provide coverage to mobile users. The combination of indoor, indoor window mount and external CPEs may provide a trade-off between cost of install and performance. For example, indoor CPEs can be used for houses that are close to another customer that has a device with an LTE eNB, whereas for houses that are further away, an external CPE will provide a combination of increased coverage and increase interference rejection, due to the increase directivity of the antenna. In some examples, the CPEs may be self-installed (e.g., end-user installed), professionally installed, or a combination thereof. Self-installation of the CPE may include self-aligning directional antennas. That is, an end user may not need to align the direction of the antennas because the antenna may autonomously align. In some examples, the CPEs may include a number of sectors (e.g., 4 sectors, 6 sectors) inside the CPE. The chipset may select a sector or a combination of sectors including adding adjacent sectors (e.g., sectors directly next to each other) or two non-adjacent sectors (e.g., sectors not directly next to each other) based on a direction of a desired signal component. For example, a direction of a desired signal may be between two sectors or there could be two reflected paths that may cause an energy to be equally incident on both sides of the CPE. In some cases, an external CPE will provide a combination of increased coverage and increased interference rejection due to the increase directivity of the antenna. In some examples, increased directivity of indoor CPEs may assist in filtering interference from unwanted directions. For example, a desired signal may travel through a main window, but interference may propagate in through the rear of the house. Thus, adjustment based on increased directivity of indoor CPEs may filter interference from the rear of the house.

Node 215-a may establish a connection with AP 205 via communication link 225. Communication link 225 between node 215-a and AP 205 may be, in some cases, wired or wireless. AP 205 may be connected to core network 250 via communication link 225. Communication link 225 between the AP and the core network 250 may also, in some cases, be a wired or wireless connection. For example, node 215-a may have a wired connection (e.g., fiber cable, CAT5/6) that connects to a separate E-band radio or direct fiber network to connect to the core network 250. In some examples, a seed node (e.g., node 215-d) may have an indirect connection to core network 250 via one or more other nodes 215. Additionally, nodes 215 (i.e., both seed nodes and non-seed nodes) may include wired interface(s) to serve a customer's home directly. As such, the radios on nodes 215 (i.e., seed nodes and non-seed nodes) interconnect to form a mesh backbone.

Node 215-a in some cases, may establish a mmW connection with one or more nodes 215 (e.g., node 215-c) using a radio of the plurality of radios, and a cellular connection with one or more nodes 215 using a radio of the plurality of radios. Nodes 215-b may be non-seed nodes. That is, nodes without a direct connection to AP 205 or core network 250. Node 215-a, node 215-b, node 215-c, and node 215-d, or any combination thereof, may be configured with a broadband connection component (e.g., LTE 4G eNodeB component). The broadband connection component may include one or more radios that enable two carriers to be aggregated non-contiguously. The two carriers may support two adjacent or non-adjacent channels. In some cases, to overcome the loss associated with conductive combining of two carriers inside a device, a simple diplexer may be used. Alternatively, in cases where the diplexer may not be used, over the air combining may be performed.

One or more nodes 215 may, additionally or alternatively, have broadband connection capability i.e., may include the LTE eNB component that provides coverage to other nodes 215 that do not support mmW or Wi-Fi connection. The broadband connection capability may be provided via a connection to the core network 250. In some examples, node 215-a may establish a connection with one or more of nodes 215-b via a broadband radio (e.g., LTE 4G eNodeB radio) or mmW radios. In this case, nodes 215-b may be configured uniquely to communicate via a broadband connection, while nodes 215-a may be configured to establish different type of connections (e.g., mmW connection, cellular connection, Wi-Fi connection) via multiple radios. Additionally, the LTE eNB component functionality may be integrated and be an additional non-mmW radio of a node 215. That is, nodes 215 may optionally provisioned with an LTE eNB component that provides coverage to other nodes 215 (e.g., customers) that do not have a 60 GHz node installed on their homes, the LTE eNB component being connected to the core network 250 through the same network that provides service for the 60 GHz node customers.

Node 215-c may be configured with one or more mmW radios. As such, node 215-c may establish a mmW connection with node 215-a, via communication link 225. Similarly, node 215-c may establish a second mmW connection with node 215-d. Additionally or alternatively, communication links 225 between node 215-c and node 215-a or node 215-d, or both may be a same or different type of connections. For example, in some cases, communication link 225 between node 215-c and node 215-a may be a mmW connection. Alternatively, communication link 225 between node 215-c and node 215-d may be a Wi-Fi connection or broadband connection. Additionally, node 215-d may be configured with multiple radios, similar to node 215-a. That is, node 215-d may establish a broadband connection with nodes 215-b, via communication links 230.

The broadband connection component may provide wide-area coverage within a neighborhood of nodes 215 to form a NAN. The NAN may provide options for a network coverage option. For example, some nodes 215 may request only a low cost Mbps service (e.g., 50-100 megabytes per second (MBps)). This may be provided by an indoor customer premise equipment (CPE). The CPE may additionally provide network connection and coverage for mobile devices in range of the nodes 215. The NAN may, additionally or alternatively, provide network connection and coverage directly for mobile devices and the CPE, which may be an LTE UE. In some examples, the NAN may include an LTE eNB or Wi-Fi AP to enable connectivity to portable or mobile devices. In some cases, the LTE eNB or Wi-Fi AP and CPE may use a same or different radio frequency (RF) band. For example, an LTE eNB and CPE may operate at a first frequency (e.g., operating within a CBRS band related to 3.5 GHz). In addition, the CPE may include a Wi-Fi AP that may operate at a second frequency (e.g., within a band related to 2.45 GHz or 2.5 GHz) to provide service to devices with a Wi-Fi radio or an LTE eNB (e.g., operating in a band related to 5 GHz). In some cases, the CPE may be located inside a node 215 or external to a node 215. For instance, interior located CPEs may be used for nodes 215 that are close to another node 215, that supports a device with a broadband coverage. Alternatively, exterior located CPEs may be used for nodes 215 that are further apart from another node 215. An external located CPE may provide a combination of increased coverage and interference rejection because of the increase of directivity of the radio.

In some examples of system 200, nodes 215 may form multiple, redundant connections, to ensure an over-connected topology is formed such that there is more than one possible path (or route) to the core network 250. Nodes 215 may form a number of point-to-multipoint connections or mesh clusters which may be interconnected at each node (e.g., node 215-c) to form a mesh segment. In some examples, system 200 may use VxLAN overlay networking to segregate subscriber traffic and enable traffic handling that scalable to large mesh network sizes. Nodes 215 may also use IPv6 and a combination of link local and stateless link auto configuration (SLACC) to prevent address pre-configuration. In some cases, the nodes 215 may use OSPF, or some other routing protocol that supports dynamic loop free routes within the mesh network. The nodes 215 may also use centralized configuration of routing tables to override OSPF based on condition(s) of system 200.

System 200 may also form a BSS by a radio of node 215-*a* because node 215-*b* may be a PBSS coordination point (PCP). In some cases, a radio of node 215-*a* may act as the PCP. Node 215-*a* may also host more than one radio. In a preferred case, node 215-*a* may host four radios. The radios may be an example of 802.11ad radios. Additionally or alternatively, the radios may, in some examples, be or include mmW radios. In some cases, the mesh network may be a mmW mesh network related to New Radio (NR) (e.g., mmW communication systems) or may be a combination of a mmW mesh network and a Wi-Fi mesh network. In some examples, each radio may transmit in a different direction to facilitate forming a mesh network (WLAN mesh network, mmW mesh network, or a combination thereof). In some cases, each radio may be exclusively used to form a single BSS. This enables each node 215 to connect to multiple BSS networks.

To form a BSS, node 215-*a* may transmit signals (via a carrier wave or mmW communication beam) using one or more radios, to become visible to other nodes within geographic coverage areas 210. For example, node 215-*a* may transmit signals to node 215-*b* via communication links 230. Node 215-*a* may additionally or alternatively, transmit signals to node 215-*c* via communication link 225. Node 215-*a* may additionally or alternatively, transmit signals to node 215-*d* via communication links 225. In some examples, any of the node 215-*b*, node 215-*c*, and node 215-*d* may alternatively serve as a PCP.

Signals may include data indicating a desired connectivity (e.g., target connection) of a corresponding node. In some cases, a target number of connections (e.g., maximum number of connections) may be based on how many nodes can be accepted by a node (i.e., PCP). Nodes 215 may have a target number of connection to connect to a number of other nodes. In some cases, nodes 215 may have a predetermined number of radios. For example, each node 215 may have four radios pointed in different directions. In addition, the target number of connections for each node 215 may be an average of four connections. That is, a node 215 may have a connection with four other nodes 215. For example, node 215-*a* may have an established connection with nodes 215-*b* and node 215-*c*, and a connection to AP 205. In some examples, one or more connections with other nodes may be initiated from the node and one or more connections may be initiated by the other node or nodes.

Additionally, the nodes associated with the target number of connections may need to have confirmed connectivity (i.e., radios enabled and already have connections with other nodes). In some cases, nodes 215-*a* may enable transmission of signals using one or more of its radios based on confirming a connectivity to a core network. The one or more radios may be idle radios that do not have an active connection with another node. If a node 215 cannot confirm a connectivity to the core network, the node 215 may deactivate its radios for transmission of signals. Node 215 may then scan for signals from other nodes 215 to establish a connection. If a node satisfies the target number of connections, the node will be connected to at least two other nodes, both with confirmed connectivity (i.e., signals enabled). Alternatively, a node 215 that is connected to a core network may allow new connections to be formed with other nodes by default, without seeking connections to the other nodes.

For example, node 215-*a* may be connected to a core network and may broadcast signals using one or more of its radios. Node 215-*a* may receive a connection request from a node based on the transmitted signals. For instance, the connection request may be transmitted by one or more nodes 215-*b* and node 215-*c*. Node 215-*a* may determine a radio availability associated with a plurality of radios. The radio availability may include a number of active connections. Node 215-*a* may establish a connection with a node (e.g., node 215-*b*, node 215-*c*) based on the radio availability. For example, node 215-*a* may determine the radio availability by comparing the number of active connections to the target number of connections. If the target number of connections is not reached, node 215-*a* may proceed to establish the connection with the node. Node 215-*a* may also allocate available resources to a radio associated with establishing the connection. The available resources may include a portion of a communication channel, transmit and receive power, etc.

One or more radios of nodes 215 may be configured to establish a connection, with other nodes, based on signals initiated by the node. Alternatively or additionally, one or more radios of nodes 215 may be configured to establish a connection, with other nodes, based on signals received from the other nodes. For example, two radios of node 215-*a* may be configured to transmit signals to nodes 215-*b* and node 215-*c*, to initiate establishing a connection with these nodes. Alternatively, two other radios of node 215-*a* may be configured to scan (listen) for signals from node 215-*d* and node 215-*e* to establish a connection with these nodes. Additionally or alternatively, all radios of a node may scan for signals from other nodes.

Nodes 215 may also be auto configuring. Once installed nodes 215 may receive configuration information from a central configuration server. In some cases, nodes 215 may establish connections with other nodes based on the received configuration information. Additionally or alternatively, AP 205 may receive the configuration information from a central configuration server (not shown) and forward the received configuration information to one or more of nodes 215 (e.g., node 215-*a*). In some examples, AP 205 may exclusively transmit the configuration information to a node 215 that is a PCP (e.g., seed node) for a mesh segment. Alternatively, AP 205 may generate the configuration information and transmit it to nodes 215.

Once topology forms, routing operates in a distributed manner to form a loop-free topology with guaranteed connectivity back to the core network 250. If links on the route fail for any reason, then the routing algorithm is able to switch over to secondary routes and can continually re-learn the underlying topology. This ensures reliable service to customers with the nodes 215, as well as reliable backhaul to the LTE eNBs.

Node 215-*a* may receive the configuration information. Based on the configuration information, node 215-*a* may identify nodes 215-*b* or node 215-*c*, or both. For example, the configuration information may include a node identifier (ID). In some examples, the configuration information may also include a type of connection to establish with nodes 215-*b* or node 215-*c*, or both, The configuration information may also include a frequency associated with the type of connection to establish. The type of connection may include an LTE connection, a Wi-Fi connection, a mmW connection, or any combination thereof.

Nodes 215-*b* and node 215-*c* may be associated with a unique ID. Node 215-*a* may determine a type of connection to establish with one or more of nodes 215-*b* and node 215-*c*. For example, node 215-*a* may determine that nodes 215-*b* are configured exclusively for a broadband connection, while node 215-*c* may be adapt to establish more than one type of connection (e.g., mmW connection and/or a broadband connection). In response, node 215-a may identify one or more radios capable of establishing broadband connections with nodes 215-b. As a result, node 215-a may establish a broadband connection with one or more of nodes 215-b. Additionally or alternatively, node 215-a may select to establish a broadband connection or a mmW connection with node 215-c based on radio capability of node 215-a, i.e., available radios. In some cases, nodes 215 may establish a connection with one another based on an autonomous self-configuration.

In an autonomous self-configuration, node 215 may scan for signals based on 802.11ad radio capability. In some examples, if any of the nodes 215 cannot establish a target number of connections, the node may perform a new scan for signals and attempt new connections such that to satisfy the target number of connections. In some cases, scanning for signals by nodes 215 may be for a preconfigured scanning interval. The scanning interval may be assigned by an operator of a node or predetermined based on the node's operating specification. Alternatively, the scanning interval may be part of the configuration information received from the central configuration server.

Node 215 may also determine whether a connection path to the core network 250 exists based an established connection. In some cases, a node 215-b may establish a connection with node 215-a. After the connection is established, node 215-b may determine a lack of a connection to the core network 250. In some examples, determining that lack of the connection to the core network 250 may be performed by transmitting a message associated with a ping function. The ping function may be designated for the core network 250 to respond to. If node 215-b does not receive a response to the transmitted message, the node may determine that no connection path to the core network 250 exists. As a result, node 215-b may drop the established connection and perform a scan for signals, at an attempt to establish a connection with another node that has a connection path (direct or indirect) to core network 250.

A connection failure between two or more nodes in system 200 may occur. In some cases, node 215-c may identify a connection failure of communication link 225 between node 215-a and node 215-c. As a result, node 215-a may establish a different connection for communicating with node 215-c, for example another node (not shown) in communication with node 215-c. In this case, node 215-a may redirect its data traffic for node 215-c through the other node (not shown). That is, node 215-a may determine a new transmission path for the data traffic associated with node 215-c. In some examples, the rerouted transmission path be of a same or different connection type. For example, the failed connection between node 215-a and node 215-c may have been a mmW connection, while the new transmission path via the other node may a broadband connection or Wi-Fi connection. Another advantage of system 200 is that it operates in a highly distributed, autonomous manner. That is, the planning effort on the network side is kept as minimal as possible to determine where LoS exists and determining at any point in time what customers can be covered by the nodes 215 with 60 GHz connections, as well as what coverage exists for LTE eNB connectivity.

Nodes 215 may perform an analysis of a network topology of system 200. For instance, in the example above, node 215-a may identify a change in a connection with node 215-c (i.e., a connection failure). As a result, node 215-a may analyze a topology of the mesh network of system 200 to identify other nodes in vicinity of node 215-a that are in communication with node 215-c. Based on the analysis, node 215-a may identify a transmission path to node 215-c via one or more of the identified nodes. Additionally, node 215-a may identify an update to the network topology based on the identified transmission path. As such, node 215-a may transmit an topology update indicator to AP 205 or to some central network topology server to update a master network topology.

One or more nodes 215 may, additionally or alternatively, be configured to perform carrier aggregation. In some cases, nodes 215 may aggregate two or more carriers using a non-contiguous mode by combining a first subset of input ports that correspond to multiple carriers and combining a second subset of input ports that correspond to the multiple carriers. The input ports may be associated with one or more radios of nodes 215. The nodes 215 may also link channels of a radio frequency band based on the aggregation. As a result, nodes 215 may provide a channel bandwidth for establishing connections with other nodes 215. Nodes 215 may perform the carrier aggregation via the LTE eNB component.

In some examples, nodes 215 may segregate subscriber data traffic and enable traffic engineering that is scalable to large mesh network sizes. To do this, nodes 215 may determine a resource utilization of the radio frequency spectrum band (e.g., how much of a bandwidth is available) and an amount of resources the subscriber traffic consumes. In some cases where not enough bandwidth of the radio frequency spectrum band is available to transmit the subscriber data traffic via one route/connection, nodes 215 may segment the subscriber traffic to multiple routes/connections. For example, node 215-a may determine a resource utilization of a radio frequency spectrum associated with a connection between node 215-a and nodes 215-b and/or node 215-c for transmitting subscriber data traffic to nodes 215-b and/or node 215-c. Node 215-a may segregate subscriber data traffic intended for transmission to nodes 215-b and/or node 215-based on the determined resource utilization. Additionally, node 215-a may identify a transmission path of the segregated subscriber data traffic. The transmission path may include one or more same or different connection types (e.g., mmW connection, cellular connection, Wi-Fi connection, or any combination thereof).

Nodes 215 may also identify the transmission path via an autonomous routing protocol or a performance metric. For example, the performance metric may relate to the node 215-a evaluating a quality of one or more connections with other nodes 215, or data traffic of the one or more connections with the other nodes 215 (e.g., identify whether the other connections are congested). The autonomous routing protocol may leverage a combination of link local and state-less link auto configuration (SLAAC), or use OSPF with wireless metrics integrated.

Some examples of system 200, nodes 215, may by default mode use distributed based approaches for topology, routing and scheduling. Any or all of these functions may be controlled in a centralized manner for any number of nodes 215. That is any one mesh segment, of which there may be multiple in a network, one or more of the nodes may be having the topology function controlled centrally through the configuration service, or it may have routing configured through some software defined networking (SDN). Additionally or alternatively, it may be have some centralized information provided to constrain when it may transmit and or receive, and to which other nodes 215, on the wireless medium. In other words, a hybrid mode of operation, where the potential benefit in terms of performance of selectively using centralized approaches can be leveraged without defaulting to a mode of operation where every node 215 requires centralized control functions. An advantage of this case is to enable system 200 to be robust to the loss of the centralized functions and also to prevent significant signaling overhead, or centralized processing requirements, in order to operate. The use of centralized approaches is instead used selectively, on an as needed basis, when it is determined that in doing so provides some overall benefit (e.g. helps reduce interference, helps reduce routing bottlenecks).

Nodes 215, as such, may include one or more wired interface to provide connections to the core network 250 via a radio or direct fiber connection. Nodes 215 may also provide services to an end customer via the connection to the core network 250. Nodes 215 in some cases may have a connection to a non-integrated LTE eNB to receive data (e.g., subscriber service via AP 205). Additionally, nodes 215 may include one or more mmW radios to provide connectivity to other mmW radios on other nodes 215. Alternatively or additionally, nodes 215 may include non or some integrated LTE eNB radio models to provide connectivity to end customers that have an LTE customer premise equipment.

In some cases, a key advantage of the architecture of nodes 215 is that it is a single, multi-function box that is not in violation under any of the FCC OTARD rules from local restrictions (state, county, city, housing association) on deployment. Another advantage of system 200 including nodes 215 is that it also enables an ultra-organic deployment approach where as soon as AP 205 or a rooftop site is deployed to provide a connection to a core network, the first customer can be connected. Once connected, coverage is provide via both the 60 GHz mesh node (through LoS) or the LTE eNB (through LoS and NLoS) to customer homes within the vicinity of the first house. These customers can be sold and instantly brought online. System 200 can then continue to organically grow. Only a modest amount of infrastructure is required to enable the first customer to be brought online, and continual building of infrastructure is not required to facilitate customer growth. Instead as customers are built out, it enables the network to cover more customers. As a result, this is advantageous in that the time between investment of capital to start building a market and time to first revenue can be very short as it doesn't require a large amount of infrastructure to be deployed, before customers are added to the network.

As a result, nodes 215 offer a cost-effective multi-Gbps fixed wireless service at a net customer acquisition cost that is lower compared to a fiber network deployment or mobile cellular network deployment. Nodes 215 additionally enable the site acquisition problem to be solved using an infrastructure-less deployment. That is, equipment installed on end-user homes connects with other end-user homes to form a mesh network. The mesh network may be a redundant, resilient connectivity without a need for acquiring number of sites to support the mesh network. The mesh network may be a Wi-Fi mesh network or a millimeter-wave (mmW) mesh network, or both.

Figure 3:
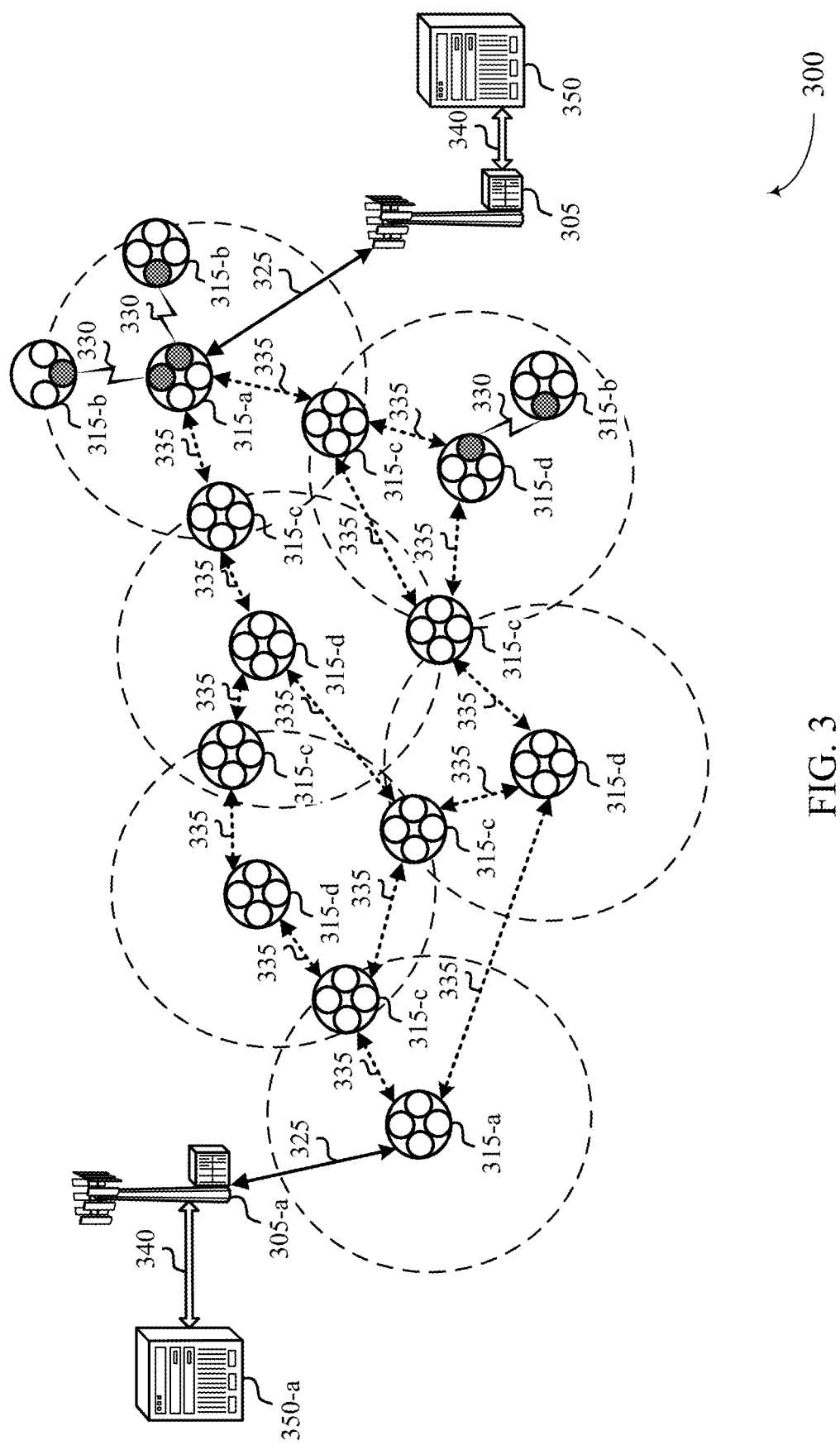
FIG. 3 illustrates an example of a system for wireless communication that supports mesh topology radio communications in accordance with aspects of the present disclosure.

FIG. 3 illustrates an example of a system 300 for wireless communication that supports mesh topology radio communications in accordance with aspects of the present disclosure. System 300 may offer a cost-effective multi-Gbps fixed wireless service at a net customer acquisition cost that may be less compared to a fiber network deployment or mobile cellular network deployment. In some cases, the network and node architecture of system 300 enables the site acquisition problem to be solved using an infrastructure-less deployment. System 300, in some examples, may be an example of multiple basic service sets segments combined into a larger network. Additionally or alternatively, the nodes may, in some examples, include mmW radios, LTE eNB radio models, among others. System 300 may be an example of one or more aspects of the system 100 and 200 of FIGS. 1 and 2. System 300 may include node 315-*a*, node 315-*b*, node 315-*c*, and node 315-*d*, which may be one or more aspects of nodes 115 or 215 as described with reference to FIGS. 1 and 2. One or more nodes 315 may be in direct or indirect communication with each other via communication links 325.

System 300 may be an example of a multiple BSS. The BSSs of system 300 may also be an ESS. One or more nodes 315 of system 300 may connect to neighboring visible nodes 315. As such, a network where a node is visible to other neighboring nodes may be formed into a single BSS or become part of an ESS. The BSS may be coordinated by the node visible to other neighboring nodes. Node 315-*a* may be a BSS coordination point (e.g., a seed node). In some examples, as a BSS coordination point, node 315-*a* may have a connection to each of the nodes of system 300. For example, node 315-*a* may establish and maintain a connection with nodes 315-*b* and node 315-*c*. Additionally, node 315-*a* may coordinate connections between other nodes. For example, node 315-*a* may coordinate a connection between node 315-*c* and node 315-*d*. Node 315-*a*, nodes 315-*b*, node 315-*c*, and node 315-*d*, or any combination thereof. Nodes 315 may also be equipment installed on end-user homes which connect with other end-user homes to form a mesh network.

Core network 350 and core network 350-*a* may provide various services (e.g., subscriber services, streaming) to nodes that are connected either directly or indirectly to the core network 350 and core network 350-*a*. Core network 350 and core network 350-*a* may also provide aggregation of service data, authentication, control/switching functionality between nodes, or act as a gateway to other networks. Node 315-*a* may be connected to the core network 350 via communication link 325 through AP 305's communication link 340 to core network 350. Alternatively, another node 315-*a* may be connected to the core network 350-*a* via communication link 325 through AP 305-*a*'s communication link 340 to core network 350-*a*. Additionally, although only two nodes are depicted in direct communication with a core network, it should be understood that any number of nodes may be connected to the core network directly or indirectly.

Node 315-*a* may be seed nodes because of being connected to core network 350 and 350-*a*. In some cases, the network (i.e., mesh network) may form starting from nodes 315-*a*. To form the mesh network of system 300, nodes 315-*a* may transmit signals using one or more radios, to become visible to other nodes. Beacons may include information indicating a desired connectivity of a corresponding node. In some cases, a target number of connections (e.g., maximum number of connections) may be based on how many nodes can be accepted by a node. Nodes 315-*a* may have a target number of connection to connect to a number of other nodes. In some cases, nodes of system 300 may have a predetermined number of radios.

For example, each node may have four radios pointed in different directions. Nodes 315, as such, may include one or more wired interface to provide connections to the core network 350 and 350-*a* via a radio or direct fiber connection. Nodes 315 may also provide services to an end customer via the connection to the core network 350 and 350-*a*. Nodes 315 in some cases may have a connection to a non-integrated LTE eNB to receive data (e.g., subscriber service via AP 305 and AP 305-a). Additionally, nodes 315 may include one or more mmW radios to provide connectivity to other mmW radios on other nodes 315. Alternatively or additionally, nodes 315 may include non or some integrated LTE eNB radio models to provide connectivity to end customers that have an LTE customer premise equipment. In addition, the target number of connections for each node of system 300 may be an average number of connections. That is, a node may have a connection with other nodes.

In some cases, having a predetermined number of target connections may control connectivity within a mesh network such that a suitable amount of radio resources are allocated for each node 315 of system 300. In addition, a search space for each node seeking to establish its target connections is also not too broad, such that the node consumes an extensive amount of time and resources for scanning for beacons and evaluating potential communication links. A node in system 300 may also monitor established connections to verify that a performance metric of the connections is satisfied and maintained. For example, a node may continuously monitor throughput, latency, or latency/throughput, or any combination thereof of an established connection. Therefore, as the network of system 300 expands from each node 315-a, the network may as a result form to be a single mesh network, or several smaller disjoint mesh networks, with each including at least one seed node.

Figure 4:
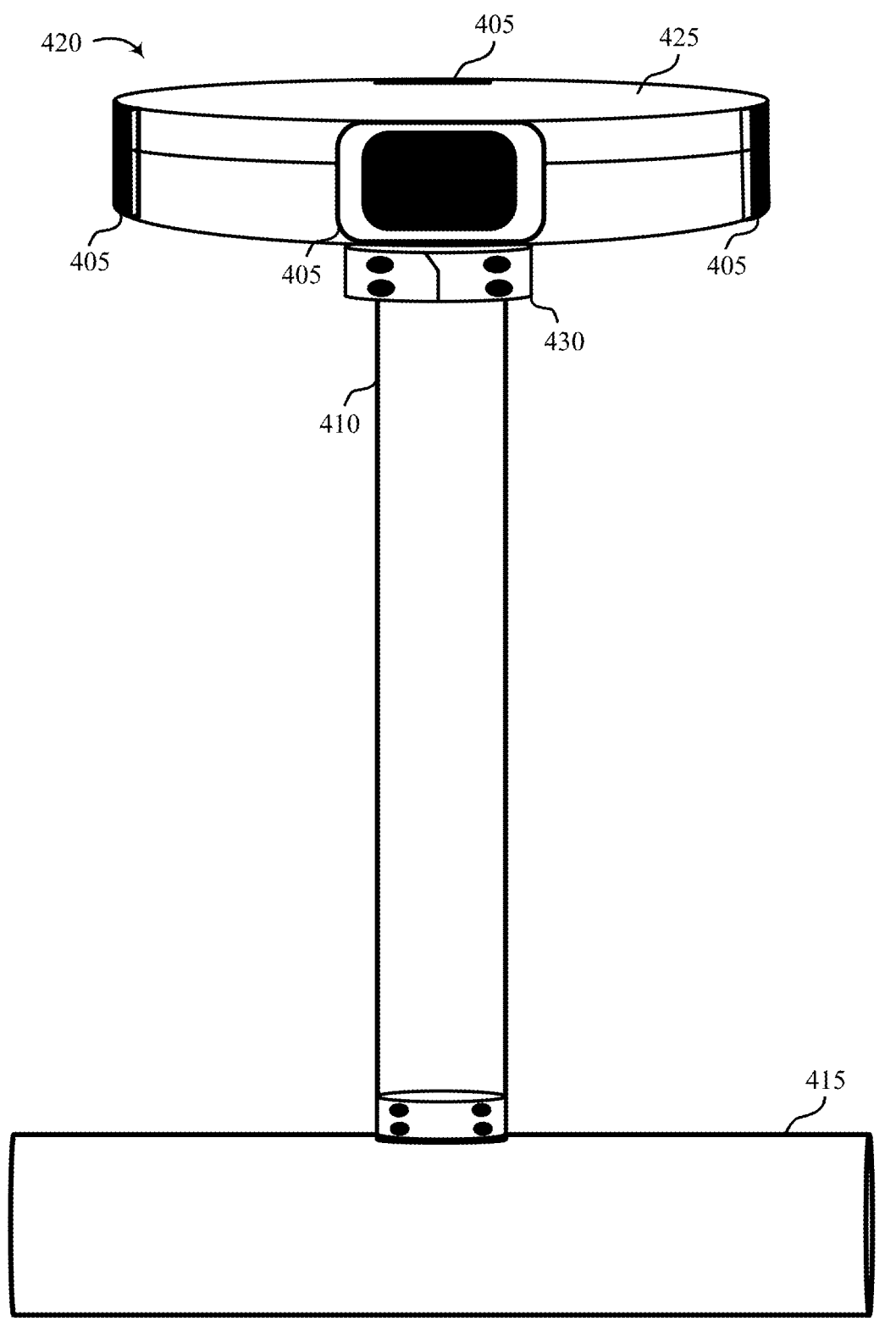
FIG. 4 illustrates an example of a device that supports mesh topology radio communications in accordance with aspects of the present disclosure.

FIG. 4 illustrates an example of a device 400 that supports mesh topology radio communications in accordance with aspects of the present disclosure. In some cases, the components and the architecture of the device 400 enables site acquisition problems to be solved using an infrastructureless deployment. The device 400 may include a radio component 420, an antenna pole 410, and a housing 415 associated with the device 400, among other components. The device 400 may also include one or more cellular radios (e.g., LTE eNB radio) within the housing 415. In some examples, the device 400 may be an example of a device that performs one or more aspects of functions associated with nodes as described in FIGS. 1 through 3.

The radio component 420 may include one or more mmW radios 405. In some examples, the device 400 may provide mmW mesh connectivity using at least one of the mmW radios 405. In some cases, the device 400 may provide 60 GHz radios with 6 to 8 Gbps aggregate capacity e.g., at least one of the mmW radios 405. This may support and enable a mesh network for access and backhaul. The device 400 may also remove LOS dependency and improve micro-site density in communication systems (e.g., mmW mesh and Wi-Fi mesh networks) using one or more cellular radios (e.g., LTE eNB radio). As a result, the device 400 may support a number of connections to and from other nodes in a network. In some cases, the antenna pole 410 may have a cavity in the middle. This may enable cabling associated with a cellular radio (e.g., an LTE eNB component) to go up through the middle of the antenna pole 410.

The device 400 may provide 360 degree steerable point-to-multipoint features. In addition, the device 400 may provide mesh networking topology management which may increase coverage and density for a network (i.e., mmW mesh network) based on the point-to-multipoint features. To provide a range of coverage, the device 400 may utilize one or more of the mmW radios 405. Each mmW radio 405 may be configured to establish a mmW connection with a node. To achieve 360 degree coverage, the mmW radios 405 may be positioned proportionally and distributed at different points on or around the radio component 420. For example, radio component 420 may have at least four mmW radios 405 that may be positioned proportionally and distributed circumferentially. In this example, each of the mmW radios 405 may be configured to provide up to 90 degrees of coverage. As a result, the combined coverage of the mmW radios 405 may obtain the 360 degrees of coverage. Alternatively, the mmW radios 405 may be positioned and distributed at a different height, or angle, or distance from each other on or relative to the radio component 420. In some cases, a subset or each of the mmW radios 405 may be configured to be a vertical coverage phase array providing a vertical range (e.g., −6 degrees to +6 degrees). In some examples, the mmW radios 405 may be enclosed within a single housing of the radio component 420.

Additionally or alternatively, the device 400 may be integrated with a cellular component (e.g., an LTE eNB component) that may further improve coverage and density ratio within a network. For example, the device 400 may provide a clear transmission path in a network, which may improve density for the network. The cellular component may include one or more radios that enable two carriers to be aggregated non-contiguously. In other words, the two carriers may support two adjacent or non-adjacent channels e.g., in citizens broadband radio service (CBRS) band, can be combined to enable a channel bandwidth of 20-40 MHz. To overcome loss associated with conductive combining of two carriers inside the device 400, a simple diplexer may be used. Alternatively, in cases where the diplexer may not be used, over the air combining may be performed. Each carrier may have two ports to support two-by-two multiple-input-multiple-output (MIMO), as such one or more radios (e.g., LTE radios) of the device 400 may have four input ports. The LTE eNB component may provide omni-like coverage for both carriers. Omni-like coverage may be provided by air combining two vertically polarized ports and two horizontal polarized ports for a first carrier and a second carrier.

In some examples, the device 400 may be 60 GHz Wi-Fi capable. In this example, the device 400 may be configured with a single high performance, low cost, low power network processor. The low power network processor may connect to two or more baseband devices (e.g., 802.11ad baseband devices). The two or more baseband devices may connect to one or more RFIC that are combined with antennas to provide a fully integrated radio and antenna component (also referred to as "radio component"). The 60 GHz Wi-Fi capability of the device 400 may also provide a range of coverage e.g., 360 degree coverage in Azimuth. The device 400 may provide the coverage using two or more mesh sectors, with each mesh section supporting a single point-to-point connection to another node in a network (e.g., mesh network).

In some cases, the radio component 420 may be coupled to the antenna pole 410 of the device 400. The antenna pole 410 may be a pole component having a geometric shape. For example, the antenna pole 410 may be cylindrical in shape and have a uniform cross-section. The antenna pole 410 may be coupled with a first section of the radio component 420. The first section may be positioned at a location (e.g., a central location) on a lower surface of the radio component 420. For example, the location may be a centroid of the lower surface.

The first section may include a connection component 430. Coupling the antenna pole 410 with the radio component 420 may be achieved by using the connection component 430. In some examples, the antenna pole 410 may include a connector or fastener positioned at an upper surface. For example, in the scenario that the antenna pole 410 is cylindrical in shape, the connector or the fastener may be positioned at an upper surface of at least one of the bases of the antenna pole 410. In addition, the first section may include or be a connector or fastener. As such, the antenna pole 410 and the radio component 420 may be coupled based on a union between a connector associated with the antenna pole 410 and a connector associated with the first section. That is, the connector associated with the first section may be a receptacle that receives and holds the connector associated with the antenna pole 410, which results in the coupling. Alternatively, the antenna pole 410 and the radio component 420 may be coupled based on a union between a fastener associated with the antenna pole 410 and a fastener associated with the first section. In some examples, a fastener associated with the first section or the antenna pole 410, or both may be a threaded fastener having internal or external screw threads (e.g., screw, nut, bolt, stud).

The connection component 430 and the antenna pole 410 may share a same fastener in some examples. A common fastener may be in addition to or an alternative to the coupling described above between the first section and the antenna pole 410. In some examples, the connection component 430 may provide a gap (e.g., circumferential gap) for the antenna pole 410 to slot through and attach to the radio component 420. For example, the connection component 430 may include a single C-clamp. The C-clamp may have additional internal grips to provide sufficient force while protecting the antenna pole 410. The C-clamp may have a circumference appropriate for the antenna pole 410 to slot through and fasten to radio component 420 (e.g., or the first section of the radio component 420). In some examples, a circumference of the C-clamp may be greater compared to a cross section area of the antenna pole 410, which provides the gap for the antenna pole 410 to slit through and attach to the radio component 420. As a result, the C-clamp may circumscribe at least a portion of the antenna pole 410. The antenna pole 410 may also have a connection interface extending a length of the antenna pole 410 and a fastener that secures the connection interface to the connection component 430. For example, a pipe connector with vertical connector board may be secured with springs, and interfacing with the radio component 420 via cable connections extending through the antenna pole 410. The pipe connector may also include a protective environmental gasket.

The device 400 may also include a fastener that secures the connection component 430 to the antenna pole 410. For example, the fastener may be a screw. In the case where the connection component 430 includes a C-clamp, the C-clamp may have a non-uniform geometric shape. For instance, the C-clamp may be configured with a fragment (e.g., ridge, recess, cavity) functioning as a receptacle for receiving a fastener. In some examples, a fastener may be an anchor bolt, a latch, or a rivet, among others.

The antenna pole 410 in some examples may house a second radio component. In some cases, the antenna pole 410 may be configured with a cavity in the middle, and the second radio component may be positioned within the cavity. The cavity may extend a length of the antenna pole 410 in some examples. In addition, the cavity may have an internal circumference (e.g., diameter) appropriate for the second radio component to be positioned in and housed within the cavity. The second radio component may be a cellular radio (e.g., LTE radio) in some examples. As such, the second radio component may be configured to establish a cellular connection with a node in the mesh network. The cavity may enable cabling associated with the cellular radio to go up through the antenna pole 410. The antenna pole 410 may also effectively be used for mounting the device 400, for example to a roof of a building.

In some examples, the mmW radios 405 and the second radio component (not shown) may be configured to operate in a same or different power mode. For example, one or more of the mmW radios 405 may be configured to operate in a first power mode (e.g., low power mode) and the second radio component may be configured to operate in a second power mode (e.g., high power mode). The mmW radios 405 and the second radio component may also be configured to switch between different power modes based on one or more requirements of the mesh network (e.g., scheduled transmission/reception, discontinuous transmission/reception). For example, in some cases the mmW radios 405 or the second radio component may transition to a low power mode (e.g., sleep mode) during discontinuous transmission/reception intervals, thereby conserving internal resources (e.g., power).

In some cases, the mmW radios 405 or the second radio component (e.g., within the cavity of antenna pole 410) may be configured to operate as a primary radio or a secondary radio. For example, mmW radios 405 may be configured to operate during a first duration and the second radio component may be configured to operate during a second duration. The first duration may be non-overlapping with the second duration. The configuration may be based on resource requirements of the device 400 in the mesh network. The device 400 may use the mmW radios 405 as a primary means for communication in a mesh network, and use the second radio component as a secondary means for communication (e.g., backup, standby). For example, in the case of LOS or NLOS scenario between the device 400 and a node, the device 400 may use the mmW radios 405 or the second radio component to communicate with the node. In some cases, the mmW radios 405 may communicate on a first channel (e.g., radio frequency spectrum band) and the second radio component may communicate on a second channel (e.g., different radio frequency spectrum band). By communicating using different channels, the mmW radios 405 and the second radio component (e.g., LTE radio) may operate (e.g., communicate, transmit, receive) concurrently in the network with minimum or no interference.

The device 400 also may be configured with a number of flanges positioned proportionally and distributed at certain locations of (e.g., circumferentially around) the radio component 420. In some cases, a group of flanges may be positioned between the mmW radios 405 of the radio component 420. The flanges may also extend across a lower surface of the radio component 420. In some examples, the flanges may be assembled from same or different types of material. For example, a type of material associated with a flange may include carbon steel, alloy steel, stainless steel, nickel alloys, super alloys, titanium, among others. The flanges may also have same or different sizes (e.g., widths, lengths, shapes). For example, a group of flanges positioned and extending across a lower surface may have a first width and a first length, and a second group of flanges positioned and extending across a lateral surface of the radio component 420 may have a second width and a second length. In some cases, the first width and length may be different from the second width and length. In some cases, a number of flanges may be aligned and positioned relative to each other according to a configuration to reduce thermal effects on the device 400. The radio component 420 may be configured with outer-facing and inner-facing flanges to dissipate heat from associated with the device 400 (i.e., the mmW radios 405). The radio component 420 may also be configured with outer-facing and inner-facing flanges that may reduce or eliminate fluid presence that may impact operation of the mmW radios 405.

One or more components of the device 400 may be configured to be modular. For example, the mmW radios 405 or the number of flanges, or both may be related to modular assembly or operation, or both. Each flange associated with the device 400 may be configured to be modified, replaced, or maintained independently from another flange. For example, at least one flange of a group of flanges may be defective (e.g., requires replacement), a maintenance personnel may be able to replace the individual flange without having to replace the group of flanges. In some cases, the mmW radios 405 or the flanges may be configured with modular control. By modularizing the mmW radios 405 or the flanges, the device 400 may experience improved network coverage and thermal management. For example, the mmW radios 405 may autonomously align with a desired transmission/reception direction based on the modular function. In some cases, a modular function of each mmW radio 405 and flange may operate independently. For example, a modular function associated with a first mmW radio or flange may operate according to a first set of parameters and a modular function associated with a second mmW radio or flange may operate according to a second set of parameters different from the first set of parameters. A parameter of a set may include an operating state (e.g., ON/OFF), an angles associated with a vertical and a horizontal axis of a mmW radio 405 or a flange, an operating mode (e.g., low power mode, high power mode, sleep mode), etc. In some cases, the set of parameters for the modular function may be preconfigured during a manufacturing and assembly procedure, or may be defined by a personnel associated with the device 400 (e.g., an end-user).

The device 400 may also include or be integrated with a GPS and Wi-Fi component (e.g., GPS/Wi-Fi radome). For example, the GPS and Wi-Fi component may be coupled with at least one flange of the radio component 420. The GPS and Wi-Fi component may provide geo-location information to one or more other devices (e.g., neighboring devices, a base station, etc.). Additionally or alternatively, the GPS and Wi-Fi component may also provide 60 GHz Wi-Fi capability.

The device 400 may also be configured to provide notifications to a personnel. These notifications may include visual, auditory, tactile, or other notifications (e.g., indicators, reports, status). The GPS and Wi-Fi component may be configured with a LED. The LED may provide a visual-based notification. For example, the LED may be configured to indicate an installation status, or a service code, or both associated with the device 400 to a personnel present at a location of the device 400.

Additionally, the LED may illuminate with certain characteristics including color, intensity, size, pattern (e.g., blinking pattern), or other visual-based information. In this case, personnel may not have to be located within a vicinity of the device 400 (e.g., within a few feet) because the personnel may be capable of identifying the notification based on the LED broadcasting at a higher intensity. For instance, in the example that the device 400 is installed and mounted on a roof of a building, the personnel may avoid climbing onto the roof to identify the notification because the notification may be identifiable to the personnel (e.g., at ground-level) based on the LED broadcasting at a higher intensity.

In some cases, the visual information may be presented with an assigned frequency (e.g., one time, multiple times) repeated over a duration. The assigned frequency and duration may be selected by the personnel, pre-configured, or some combination. In some cases, the device 400 may also include a plurality of LEDs. Each LED may be associated with different information (e.g., an operating status, service indicator, signal strength, device failure indicator, etc.). In some examples, each LED may illuminate with same or varying intensities based on information determined, received, correlated, and/or measured relating to the device 400. The LED may illuminate based on an operating characteristic related to the device 400. An operating characteristic may include a power status indicator, a connection indicator, or a signal strength indicator, or any combination thereof. For example, an LED may illuminate with a certain color, intensity, pattern, to indicate a signal strength (e.g., received signal strength indicator (RSSI)) associated with the mmW radios 405.

The device 400 may also be configured with a cover component 425 that may be coupled with an upper surface of the radio component 420. The cover component 425 may provide protection for the radio component 420 from the effects of wind, snow, ice and freezing temperatures to rain, salt, sand, the sun (e.g., excessive thermal heat) or to provide an environment where concealment of the device 400 may be critical for security. In some examples, to provide protection for the radio component 420 from various adverse sources (e.g., excessive thermal heat from the sun), the cover component 425 may be coated (e.g., layered) with an ultra-violet high rating material. As a result, the cover component 425 may operate as a heat shield for the radio component 420.

Coupling the cover component 425 with the upper surface of the radio component 420 may be accomplished by a single or a set of connection components. In some examples, the radio component 420 may be configured with a set of fasteners or connectors positioned proportionally or un-proportionally across the upper surface of the radio component 420. In addition, the cover component 425 may include a single connection component or set of connection components. As such, the cover component 425 and the radio component 420 may be coupled based on a union between a set of fasteners associated with the cover component 425 and a set of fasteners associated with the radio component 420. In some examples, a connector or fastener may be magnetic-based or mechanical-based. In the mechanical-based examples, a fastener may include a threaded fastener having internal or external screw threads (e.g., screw, nut, bolt, stud). In the magnetic-based, a connector may have a magnetic element that may be positioned on a surface of the connector.

For example, a magnetic connector associated with the cover component 425 may have a magnetic element positioned on a surface of the connector. The magnetic element may be biased to have only a single surface expresses magnetic properties. The radio component 420 may also have a magnetic connector having am magnetic element positioned on a surface of the connector that is also positioned on a portion of the upper surface. Similarly, the connector may be biased to have only a single surface that embodies magnetic properties. The cover component 425 may magnetically couple with the radio component 420 based on magnetic attraction between the first and second magnetic connectors.

In some cases, the cover component 425 may be integrated with a handle component. The handle component may be positioned and attached to a surface of the cover component 425. In this case, the handle component may also be coated with a same material as the cover component 425 (e.g., ultra-violet high rating material). In some cases, the handle component may provide benefits to the personnel in scenarios where access to an interior compartment of the radio component 420 may be necessary for service and maintenance. In some examples, the handle component may have the capability to attach and detach from the cover component 425. The handle component may have a fixed size (e.g., length or width, or both). Alternatively, the handle component may be configured to provide a variable size e.g., in length and width. The variable size may be provided based on a type or a material of the handle component.

Device 400 may operate in the mmW spectrum in conjunction with traditional operation in a lower frequency (e.g., <6 GHz) spectrum. The mmW spectrum may utilize usage of higher frequency bands e.g., up to 24 GHz or more, for carrying a portion of user traffic data towards a core network. As a result, the device 400 may support and provide a mesh network that becomes a resilient, high capacity network that delivers cost effective multi-Gbps connections to subscribers without the use of traditional sites.

Figure 5:
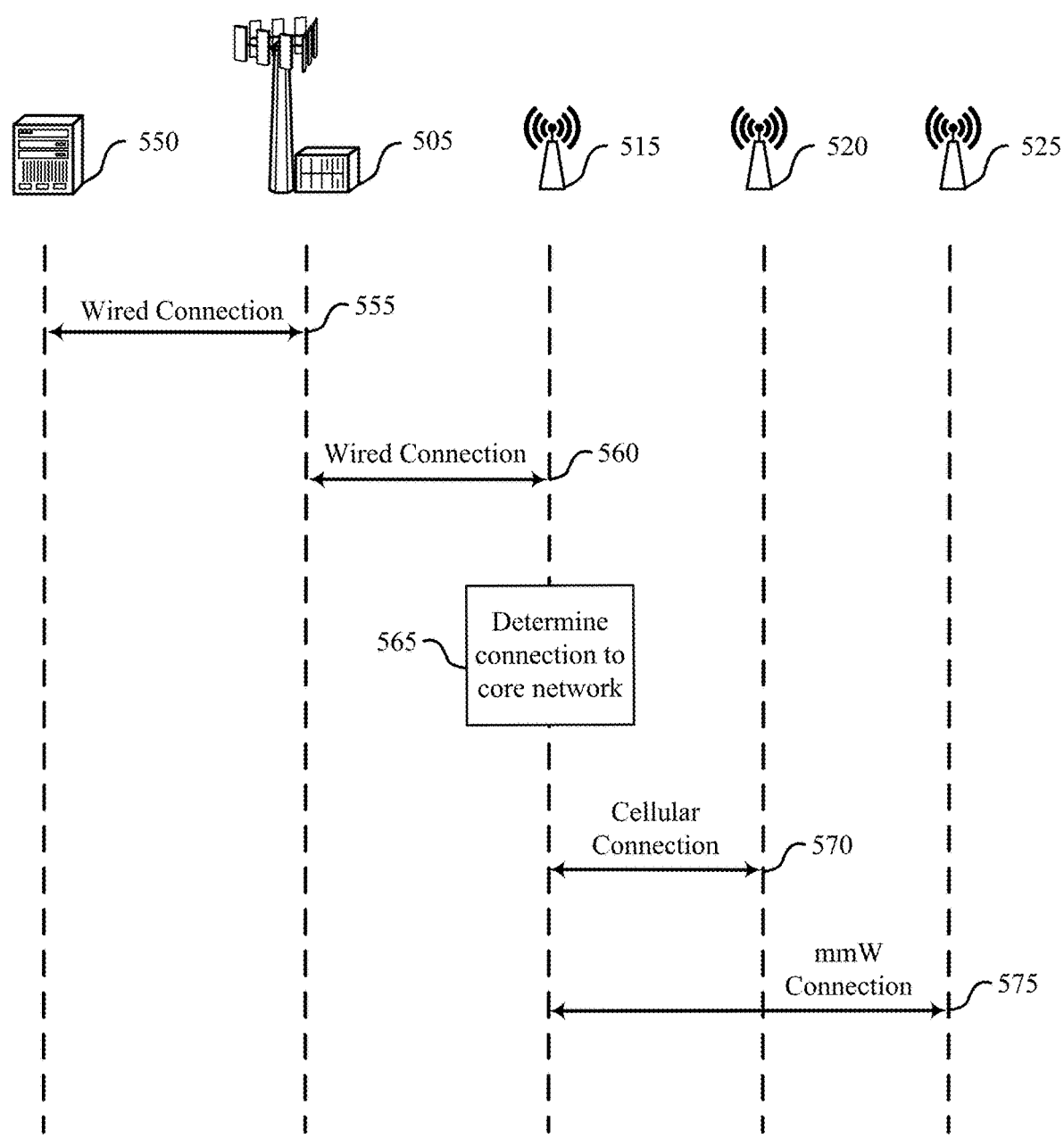
FIG. 5 illustrates an example of a process flow that supports mesh topology radio communications in accordance with aspects of the present disclosure.

FIG. 5 illustrates an example of a process flow 500 that supports mesh topology radio communications in accordance with aspects of the present disclosure. Process flow 500 may include AP 505, a seed node 515, a non-seed node 520, a second non-seed node 525, a core network 550, which may be examples of the corresponding devices described with reference to FIGS. 1-4.

At 555, AP 505 and core network 550 may establish a connection. The connection may be a wired or wireless connection, in some cases. For example, the connection may be a wired connection such as via a fiber cable, CAT5/6, etc. At 560, seed node 515 may establish a connection with AP 505. The connection may also be a wired connection or alternatively a wireless connection.

At 565, seed node 515 may determine that it is connected to the core network 550 based on the established connection with AP 505. As a result, seed node 515 may activate signals using one or more radios to establish connections with other nodes. In some cases, seed node 515 may enable transmission of beacons on one or more of its radios based on confirming a connectivity to the core network 5550 via AP 505. The one or more radios may be idle radios that do not have an active connection with another node. If node 515 cannot confirm a connectivity to the core network 550, the node 215 may deactivate its radios for transmission of beacons. Node 515 may then scan for beacons from other nodes (e.g., nodes 520 or 525) to establish a connection.

Seed node 515 may be configured to establish a connection, with non-seed node 520 and non-seed node 525, based on beacons initiated by seed node 515. Alternatively or additionally, one or more radios of seed node 515 may be configured to establish a connection, with non-seed node 520 and non-seed node 525, based on beacons received from the these nodes. For example, two radios of seed node 515 may be configured to transmit beacons to non-seed node 520 and non-seed node 525, to initiate establishing a connection with these nodes. Alternatively, two other radios of seed node 515 may be configured to scan (listen) for beacons from non-seed node 520 and non-seed node 525 to establish a connection with these nodes. Additionally or alternatively, all radios of a node may scan for beacons from other nodes.

In some examples, seed node 515, non-seed node 520, and non-seed node 525 may be configured with same or different radios. For example, seed node 515 may include mmW radios and cellular radios (e.g., LTE eNB radios). Alternatively, non-seed node 520 may be configured with exclusively cellular radios, while non-seed node 525 may be configured with mmW radios. As such, seed node 515 may be capable of establishing both a connection with non-seed node 520 and non-seed node 525 using respective radios. For instance, at 570, seed node 515 may establish a connection with a non-seed node 520. The connection may be a broadband connection (e.g., LTE eNB connection), as discussed elsewhere herein. At 575, seed node 515 may establish another connection with the second non-seed node 525. The connection may be a mmW connection, as discussed elsewhere herein.

In some cases, seed node 515, non-seed node 520, and non-seed node 525, or any combination thereof may include equipment that provides a broadband connection component (e.g., LTE eNodeB component). The broadband connection component may include one or more radios that enable connections with seed node 515, non-seed node 520, and non-seed node 525 that lack capability to establish mmW connections. In some examples, the broadband connection component may be an optional component associated with a seed node 515, non-seed node 520, and non-seed node 525. The broadband connection component may also ensure contiguous coverage over a mesh network In some examples, seed node 515 may receive configuration information from a central configuration server. Alternatively, in some cases seed node may receive the configuration information from AP 505. Seed node 515 may establish the connections with non-seed node 520 and non-seed node 525 based on the received configuration information. Seed node 515 may also identify non-seed node 520 and non-seed node 525 based on the configuration information. For example, the configuration information may indicate a type of connection to establish, a frequency associated with the type of connection to establish, or a node identifier (ID) identifying a node to connect with in the mmW mesh network, or a combination thereof. For example, seed node 515 may be aware that non-seed node 520 may be capable of establishing a mmW connection, but may not include cellular connection capability. Alternatively, seed node 515 may be notified based on the received configuration information that non-seed node 525 is capable of establishing a cellular connection, but may not include mmW connection capability.

Figure 6:
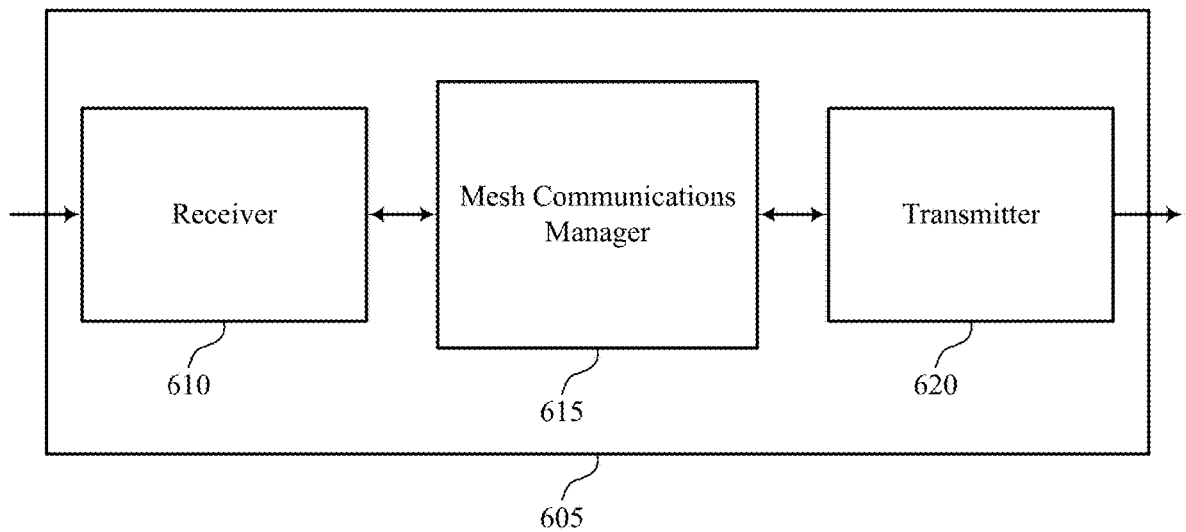
FIGS. 6 through 8 show block diagrams of a device that supports mesh topology radio communications in accordance with aspects of the present disclosure.

FIG. 6 shows a block diagram 600 of a wireless device 605 that supports mesh topology radio communications in accordance with aspects of the present disclosure. Wireless device 605 may be an example of aspects of a node 115 as described with reference to FIG. 1. Wireless device 605 may include receiver 610, mesh communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to mesh topology radios, etc.). Information may be passed on to other components of the device. The receiver 610 may be an example of aspects of the transceiver 935 described with reference to FIG. 9. The receiver 610 may utilize a single antenna or a set of antennas.

Mesh communications manager 615 and/or at least some of its various sub-components may be implemented in hardware, software executed by a processor, firmware, or any combination thereof. If implemented in software executed by a processor, the functions of the mesh communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The mesh communications manager 615 and/or at least some of its various sub-components may be physically located at various positions, including being distributed such that portions of functions are implemented at different physical locations by one or more physical devices. In some examples, mesh communications manager 615 and/or at least some of its various sub-components may be a separate and distinct component in accordance with various aspects of the present disclosure. In other examples, mesh communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Mesh communications manager 615 may include memory in electronic communication with a processor. The mesh communications manager 615 may also establish, using a wired interface, a first connection with an access point having a dedicated connection with a core network, establish, using a first radio of a set of radios, a first mmW connection with a first node of a mmW mesh network, and establish, using a second radio of the set of radios, a second mmW connection with a second node of the mmW mesh network.

Transmitter 620 may transmit signals generated by other components of the device. In some examples, the transmitter 620 may be collocated with a receiver 610 in a transceiver component. For example, the transmitter 620 may be an example of aspects of the transceiver 935 described with reference to FIG. 9. The transmitter 620 may utilize a single antenna or a set of antennas.

Figure 7:
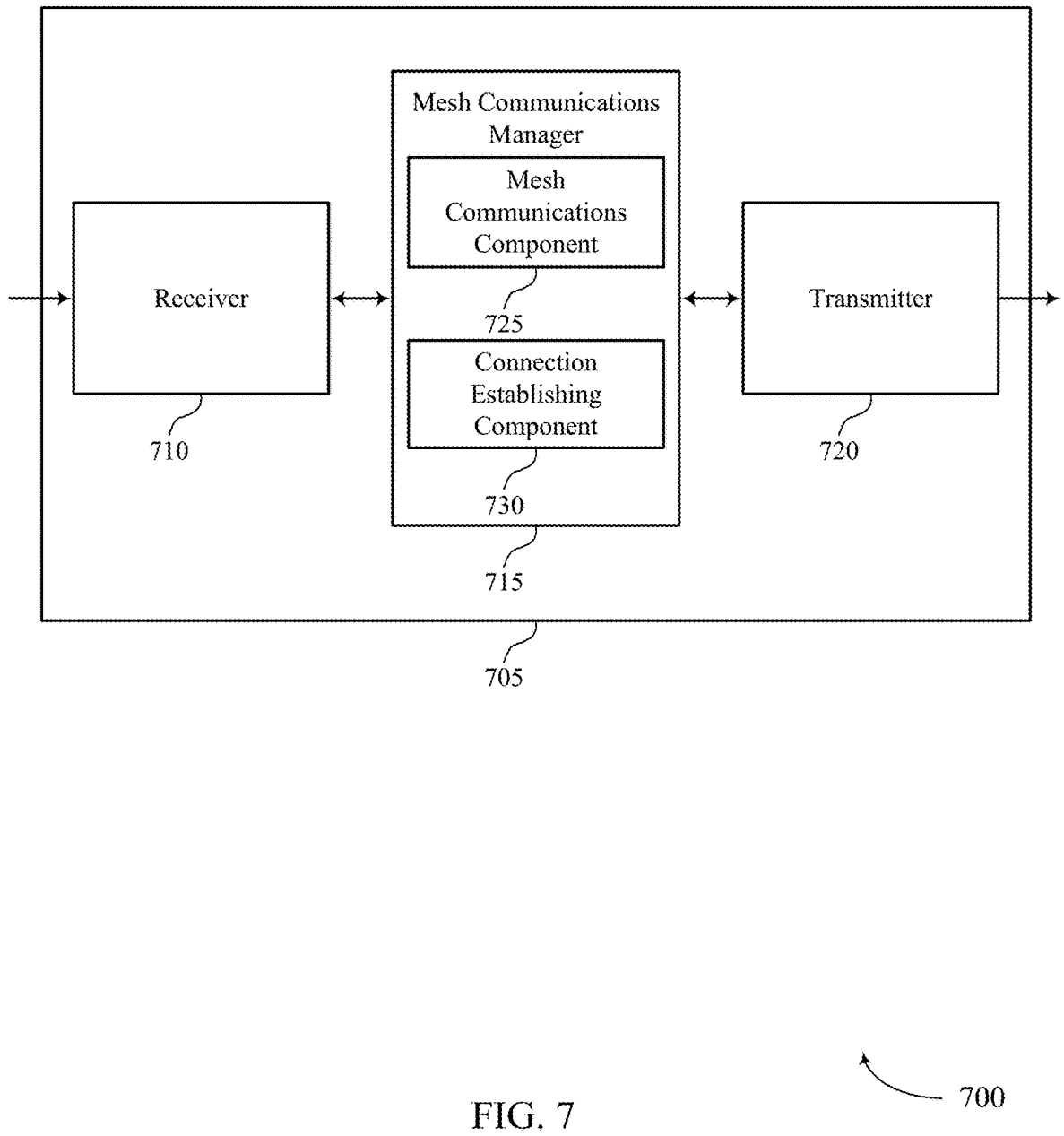

FIG. 7 shows a block diagram 700 of a wireless device 705 that supports mesh topology radio communications in accordance with aspects of the present disclosure. Wireless device 705 may be an example of aspects of a wireless device 605 or a node 115 as described with reference to FIGS. 1 and 6. Wireless device 705 may include receiver 710, mesh communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to mesh topology radios, etc.). Information may be passed on to other components of the device. The receiver 710 may be an example of aspects of the transceiver 935 described with reference to FIG. 9. The receiver 710 may utilize a single antenna or a set of antennas.

Mesh communications manager 715 may be an example of aspects of the mesh communications manager 615 described with reference to FIG. 6. Mesh communications manager 715 may also include mesh communications component 725 and connection establishing component 730.

Mesh communications component 725 may include memory in electronic communication with a processor. In some cases, two or more baseband circuits in electronic communication with a second radio and a third radio, and one or more radio frequency integrated circuits to provide a set of radio sectors for a mmW mesh network. In some cases, mesh communications component 725 may be configured to provide a point-to-point connection or a point-to-multipoint connection using one or more radio sectors corresponding to a first mmW connection or a second mmW connection, or both.

Connection establishing component 730 may identify that a first node is connected to a core network. In some examples, establishing the first mmW connection includes establishing a point-to-point connection with the first node. Connection establishing component 730 may, establish, using a wired interface, a first connection with an access point having a dedicated connection with a core network. In some examples, connection establishing component 730 may also, establish, using a first radio of a set of radios, a first mmW connection with a first node of a mmW mesh network. Connection establishing component 730 may, in some examples, establish, using a second radio of the set of radios, a second mmW connection with a second node of the mmW mesh network, and establish, using a third radio of the set of radios, a cellular connection with the first node or the second node of the mmW mesh network.

In some cases, the first radio, the second radio, and the third radio are contained within a single housing. In some cases, the first node and the second node are a same node. In some examples, connection establishing component 730 may be configured to identify that the first node and the second node are the same node and communicate with the same node using the second radio or the third radio based on the identification. In some cases, the third radio includes a set of input ports, the connection establishing component 730 may be configured to combine a number of input ports that are each associated with different carriers. In some cases, establishing the first mmW connection, the second mmW connection, the cellular connection, or a combination thereof is based on an autonomous self-configuration. In some cases, the first node and the second node are connected to a third node, where the first mmW connection and the second mmW connection include alternative connections from the third node to the access point having the dedicated connection with the core network.

Transmitter 720 may transmit signals generated by other components of the device. In some examples, the transmitter 720 may be collocated with a receiver 710 in a transceiver component. For example, the transmitter 720 may be an example of aspects of the transceiver 935 described with reference to FIG. 9. The transmitter 720 may utilize a single antenna or a set of antennas.

Figure 8:
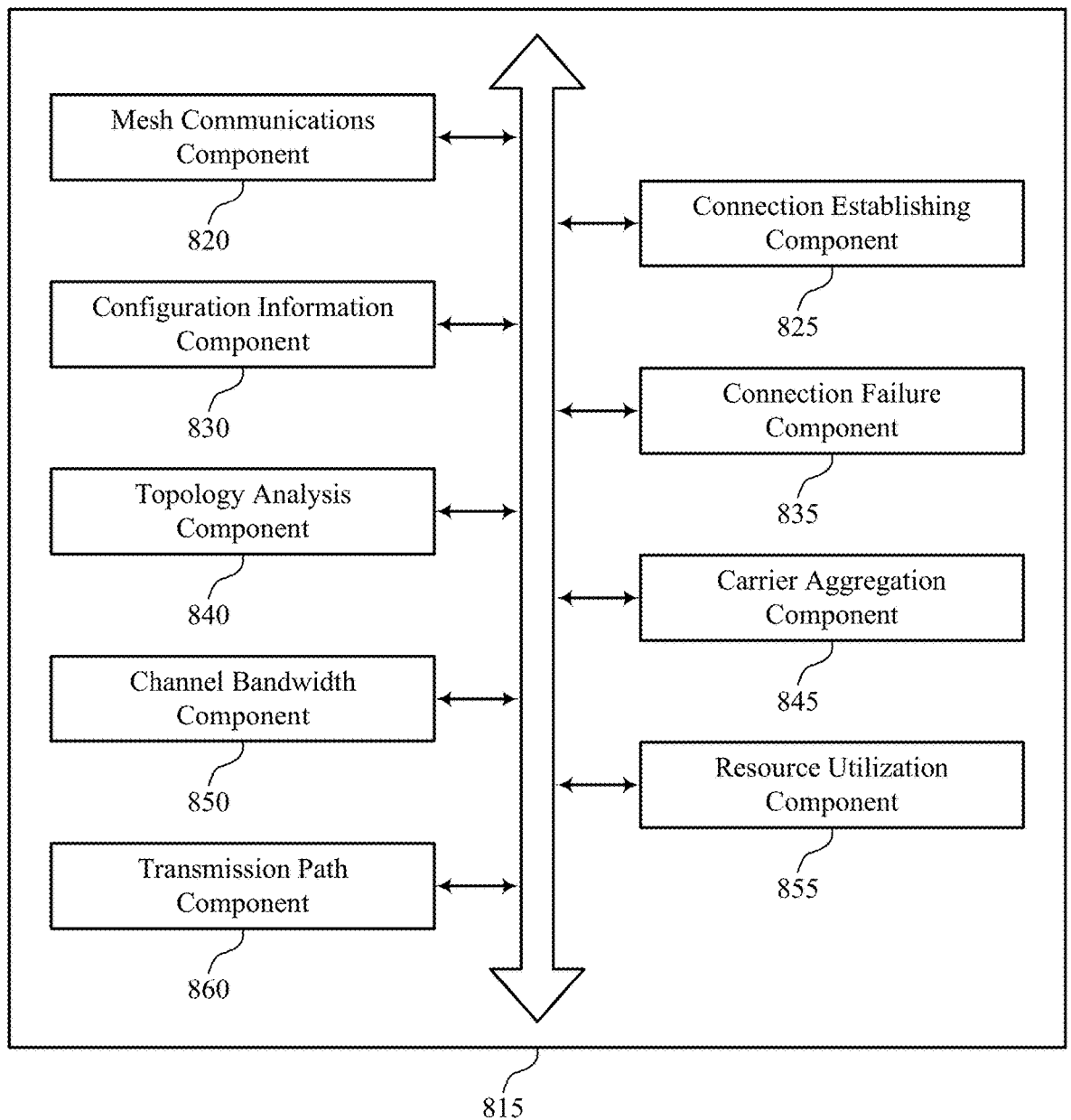

FIG. 8 shows a block diagram 800 of a mesh communications manager 815 that supports mesh topology radio communications in accordance with aspects of the present disclosure. The mesh communications manager 815 may be an example of aspects of a mesh communications manager 615 or a mesh communications manager 715 described with reference to FIGS. 6 and 7. The mesh communications manager 815 may include mesh communications component 820, connection establishing component 825, configuration information component 830, connection failure component 835, topology analysis component 840, carrier aggregation component 845, channel bandwidth component 850, resource utilization component 855, and transmission path component 860. Each of these components may communicate, directly or indirectly, with one another (e.g., via one or more buses).

Mesh communications component 820 may include memory in electronic communication with a processor. Mesh communications component 820 may include two or more baseband circuits in electronic communication with a second radio and a third radio, and one or more radio frequency integrated circuits to provide a set of radio sectors for the mmW mesh network. In some cases, the mesh communications component 820 may be configured to provide a point-to-point connection or a point-to-multipoint connection using one or more radio sectors corresponding to a first mmW connection or a second mmW connection, or both.

Connection establishing component 825 may identify that the first node is connected to a core network. In some cases, establishing a first mmW connection includes establishing a point-to-point connection with the first node. Connection establishing component 825 may establish, using a wired interface, a first connection with an access point having a dedicated connection with a core network. In some cases, connection establishing component 825 may establish, using a first radio of a set of radios, a first mmW connection with a first node of a mmW mesh network. Additionally or alternatively, connection establishing component 825 may establish, using a second radio of the set of radios, a second mmW connection with a second node of the mmW mesh network. Alternatively, connection establishing component 825 may establish, using a third radio of the set of radios, a cellular connection with the first node or the second node of the mmW mesh network.

In some cases, connection establishing component 825 may include a wired communication interface, in electronic communication with the processor, to establish the first connection with an access point having a dedicated connection with a core network. In some cases, connection establishing component 825 may include a second radio, in electronic communication with the processor, to establish a second mmW connection with a second node of the mmW mesh network. In some cases, connection establishing component 825 may include a third radio, in electronic communication with the processor, to establish a cellular connection with the first node or the second node of the mmW mesh network. In some cases, the first radio, the second radio, and the third radio are contained within a single housing. In some cases, the first node and the second node are a same node, and where the apparatus is configured to identify that the first node and the second node are the same node and communicate with the same node using the second radio or the third radio based on the identification. In some cases, the third radio includes a set of input ports, the connection establishing component 825 may be configured to combine a number of input ports that are each associated with different carriers.

In some cases, establishing the first mmW connection, the second mmW connection, the cellular connection, or a combination thereof is based on an autonomous self-configuration. In some cases, the first node and the second node are connected to a third node. In some examples, the first mmW connection and the second mmW connection may include alternative connections from the third node to the access point having the dedicated connection with the core network.

Configuration information component 830 may receive configuration information associated with the mmW mesh network from a central configuration server. In some examples, establishing the first mmW connection, the second mmW connection, the cellular connection, or a combination thereof is based on the received configuration information. Configuration information component 830 may identify the first node or the second node, or both based on the configuration information. In some examples, establishing the first mmW connection with the first node or the second mmW connection with the second node, or both is based on a node identifier (ID) of the first node or the second node, or both received in the configuration information. In some cases, the configuration information includes a type of connection to establish, a frequency associated with the type of connection to establish, or a node ID identifying a node to connect with in the mmW mesh network, or a combination thereof. In some cases, the type of connection includes a LTE connection, a Wi-Fi connection, a mmW connection, or a combination thereof.

Connection failure component 835 may identify a failure of the first mmW connection with the first node of the mmW mesh network and communicate with the first node using the second mmW connection with the second node or a connection associated with a third node based on the failure. In some examples, the connection associated with the third node includes a mmW connection or a cellular connection, or both.

Topology analysis component 840 may analyze a topology of the mmW mesh network based on a change in a connection with the first node. In some examples, the change in the connection is associated with the identified failure of the first mmW connection. Topology analysis component 840 may identify an update to the topology of the mmW mesh network based on the analysis. In some cases, the second node and the third node are in communication with the first node. The second mmW connection with the second node and the connection with the third node include alternative connections with the core network for the first node.

Carrier aggregation component 845 may aggregate at least two carriers using a non-contiguous mode by combining a first subset of input ports that correspond to multiple carriers and combining a second subset of input ports that correspond to the multiple carriers and link at least channels of a radio frequency band based on the aggregation. Channel bandwidth component 850 may provide a channel bandwidth for establishing the cellular connection with the first node or the second node of the mmW mesh network based on the linking. In some examples, the established cellular connection is based on the channel bandwidth. Resource utilization component 855 may determine a resource utilization of a radio frequency spectrum associated with the first mmW connection for transmitting subscriber data traffic to the first node and segregate subscriber data traffic intended for transmission to the first node based on the determined resource utilization.

Transmission path component 860 may identify a transmission path of the segregated subscriber data traffic. In some examples, the transmission path includes the first mmW connection, the second mmW connection, or the cellular connection, or any combination thereof. Transmission path component 860 may receive scheduling and routing information associated with one or more transmission intervals and whether to transmit subscriber data traffic during the one or more transmission intervals using one or more different connection types. In some examples, the one or more connections types includes the first mmW connection, the second mmW connection, or the cellular connection, or any combination thereof.

Figure 9:
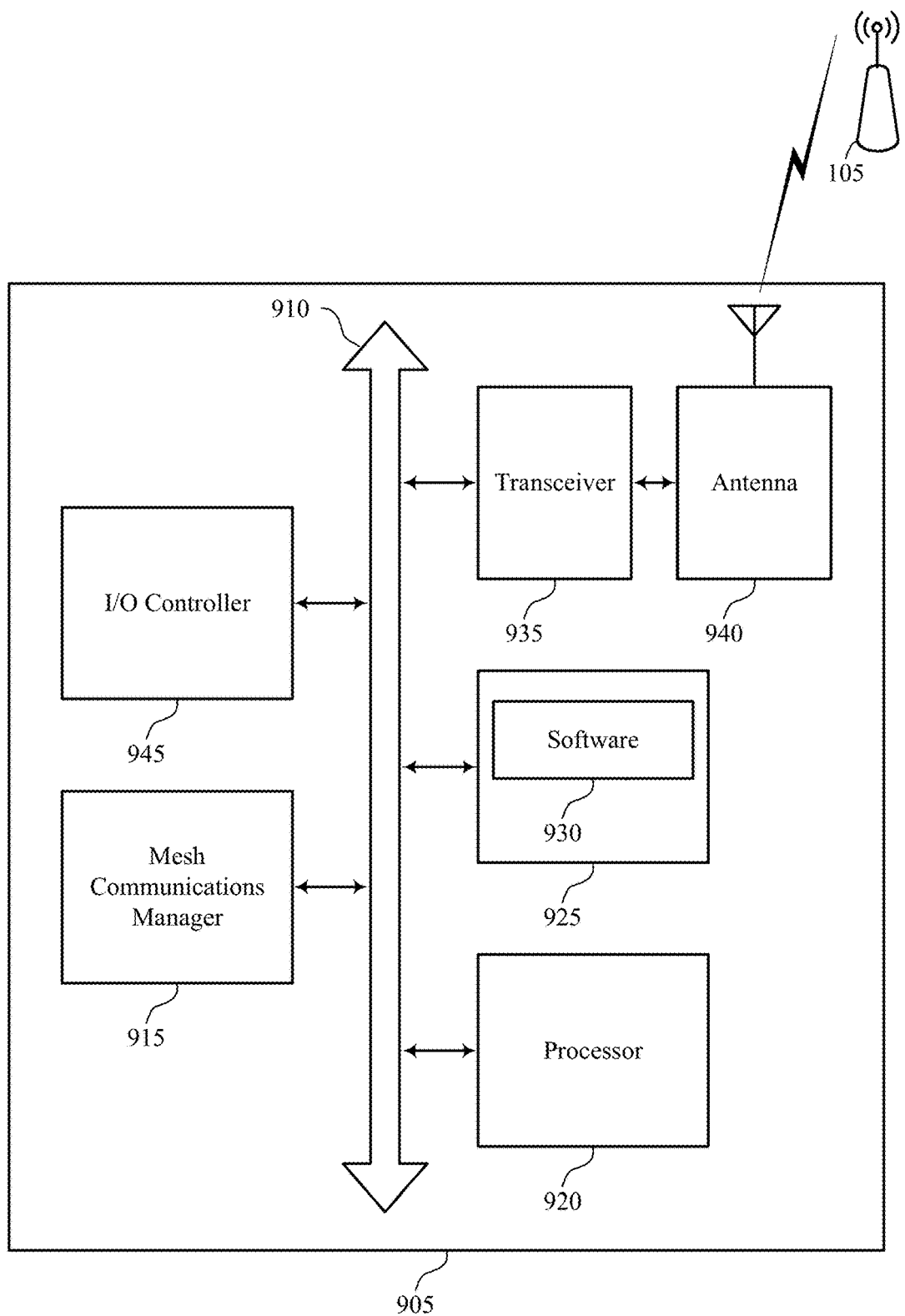
FIG. 9 illustrates a block diagram of a system including a node that supports mesh topology radio communications in accordance with aspects of the present disclosure.

FIG. 9 shows a diagram of a system 900 including a device 905 that supports mesh topology radio communications in accordance with aspects of the present disclosure. Device 905 may be an example of or include the components of wireless device 605, wireless device 705, or a node 115 as described above, e.g., with reference to FIGS. 1, 6, and 7. Device 905 may include components for bi-directional voice and data communications including components for transmitting and receiving communications, including mesh communications manager 915, processor 920, memory 925, software 930, transceiver 935, antenna 940, and I/O controller 945. These components may be in electronic communication via one or more busses (e.g., bus 910).

Mesh communications manager 915 may establish using a wired interface a first connection with an access point having a dedicated connection with a core network. In some examples, mesh communications manager 915 may establish, using a first radio of a plurality of radios, a first mmW connection with a first node of a mmW mesh network, and establish using a second radio of the plurality of radios, a second mmW connection with a second node of the mmW mesh network. Additionally or alternatively, mesh communications manager 915 establish, using a third radio of the plurality of radios, a cellular connection with the first node or the second node of the mmW mesh network.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting mesh topology radio).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware and/or software operation such as the interaction with peripheral components or devices.

Software 930 may include code to implement aspects of the present disclosure, including code to support mesh topology radio. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas. In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
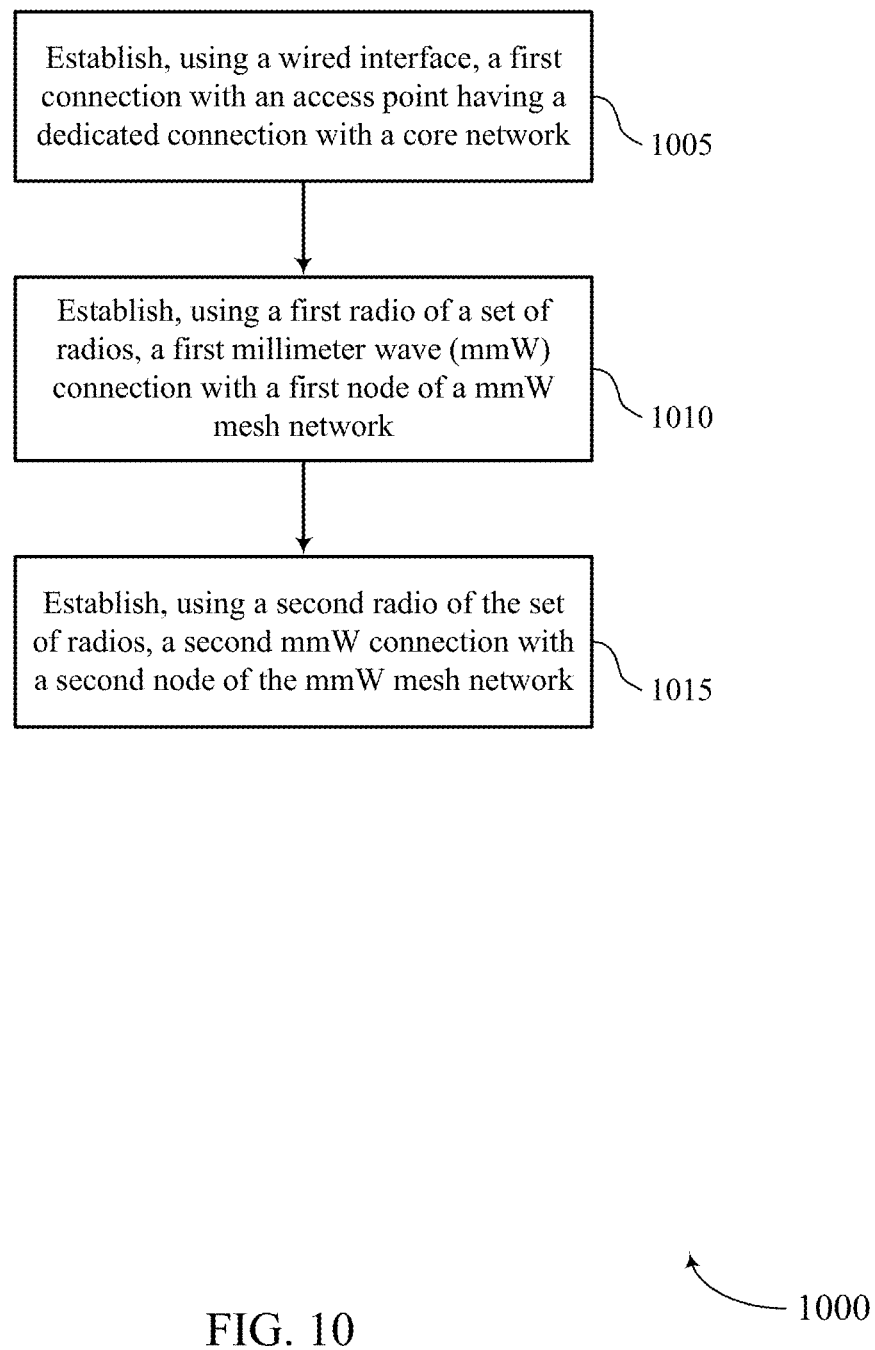
FIGS. 10 through 13 illustrate methods for mesh topology radio communications in accordance with aspects of the present disclosure.

FIG. 10 shows a flowchart illustrating a method 1000 for mesh topology radio communications in accordance with aspects of the present disclosure. The operations of method 1000 may be implemented by a node 115 or its components as described herein. For example, the operations of method 1000 may be performed by a mesh communications manager as described with reference to FIGS. 6 through 9. In some examples, a node 115 may execute a set of codes to control the functional elements of the device to perform the functions described below. Additionally or alternatively, the node 115 may perform aspects of the functions described below using special-purpose hardware.

At block 1005 the node 115 may establish, using a wired interface, a first connection with an access point having a dedicated connection with a core network. The operations of block 1005 may be performed according to the methods described with reference to FIGS. 1 through 5. In certain examples, aspects of the operations of block 1005 may be performed by a connection establishing component as described with reference to FIGS. 6 through 9.

At block 1010 the node 115 may establish, using a first radio of a plurality of radios, a first mmW connection with a first node of a mmW mesh network. The operations of block 1010 may be performed according to the methods described with reference to FIGS. 1 through 5. In certain examples, aspects of the operations of block 1010 may be performed by a connection establishing component as described with reference to FIGS. 6 through 9.

At block 1015 the node 115 may establish, using a second radio of the plurality of radios, a second mmW connection with a second node of the mmW mesh network. The operations of block 1015 may be performed according to the methods described with reference to FIGS. 1 through 5. In certain examples, aspects of the operations of block 1015 may be performed by a connection establishing component as described with reference to FIGS. 6 through 9.

Figure 11:
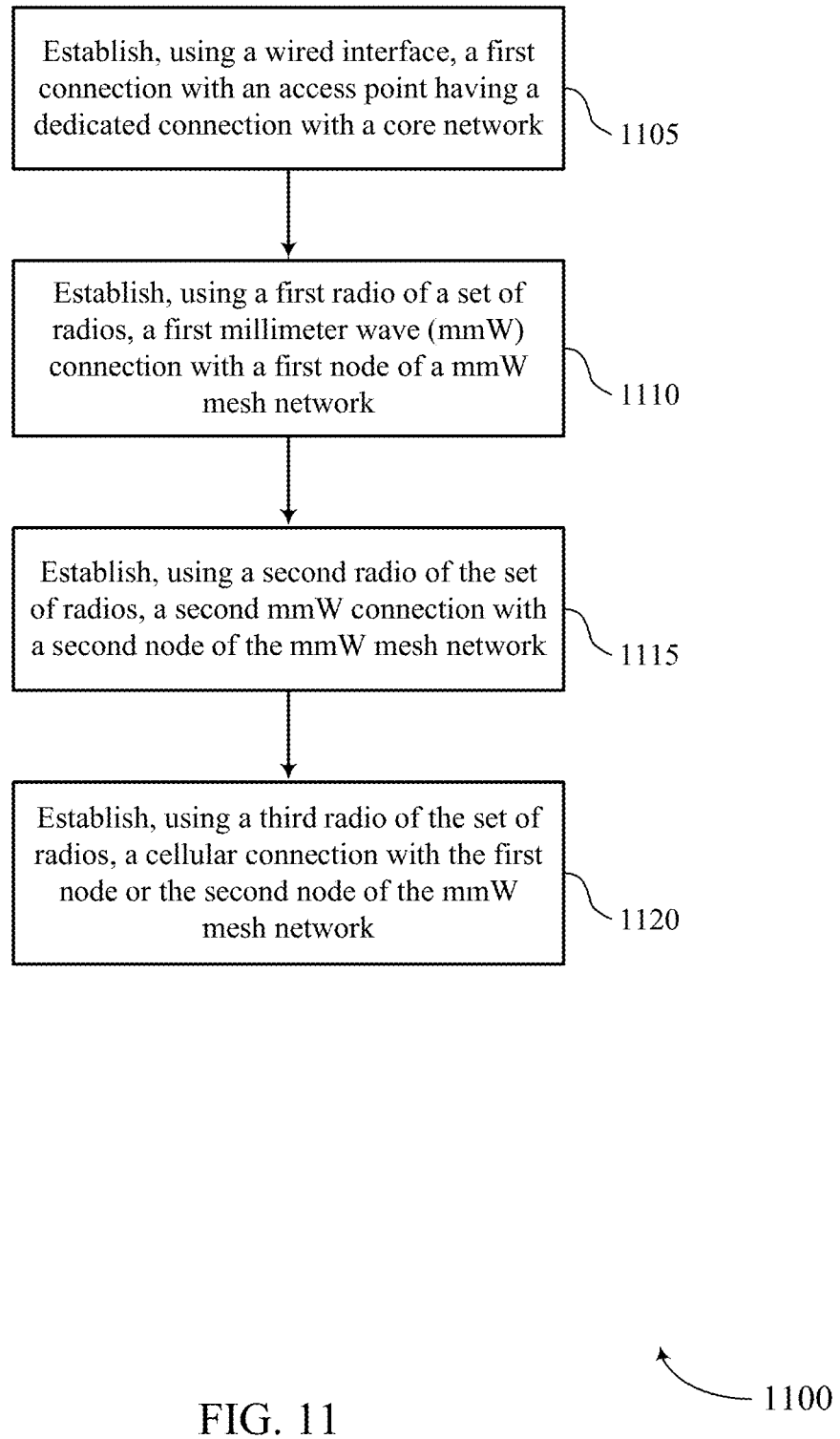

FIG. 11 shows a flowchart illustrating a method 1100 for mesh topology radio communications in accordance with aspects of the present disclosure. The operations of method 1100 may be implemented by a node 115 or its components as described herein. For example, the operations of method 1100 may be performed by a mesh communications manager as described with reference to FIGS. 6 through 9. In some examples, a node 115 may execute a set of codes to control the functional elements of the device to perform the functions described below. Additionally or alternatively, the node 115 may perform aspects of the functions described below using special-purpose hardware.

At block 1105 the node 115 may establish, using a wired interface, a first connection with an access point having a dedicated connection with a core network. The operations of block 1105 may be performed according to the methods described with reference to FIGS. 1 through 5. In certain examples, aspects of the operations of block 1105 may be performed by a connection establishing component as described with reference to FIGS. 6 through 9.

At block 1110 the node 115 may establish, using a first radio of a plurality of radios, a first mmW connection with a first node of a mmW mesh network. The operations of block 1110 may be performed according to the methods described with reference to FIGS. 1 through 5. In certain examples, aspects of the operations of block 1110 may be performed by a connection establishing component as described with reference to FIGS. 6 through 9.

At block 1115 the node 115 may establish, using a second radio of the plurality of radios, a second mmW connection with a second node of the mmW mesh network. The operations of block 1115 may be performed according to the methods described with reference to FIGS. 1 through 5. In certain examples, aspects of the operations of block 1115 may be performed by a connection establishing component as described with reference to FIGS. 6 through 9.

At block 1120 the node 115 may establish, using a third radio of the plurality of radios, a cellular connection with the first node or the second node of the mmW mesh network. The operations of block 1120 may be performed according to the methods described with reference to FIGS. 1 through 5. In certain examples, aspects of the operations of block 1120 may be performed by a connection establishing component as described with reference to FIGS. 6 through 9.

Figure 12:
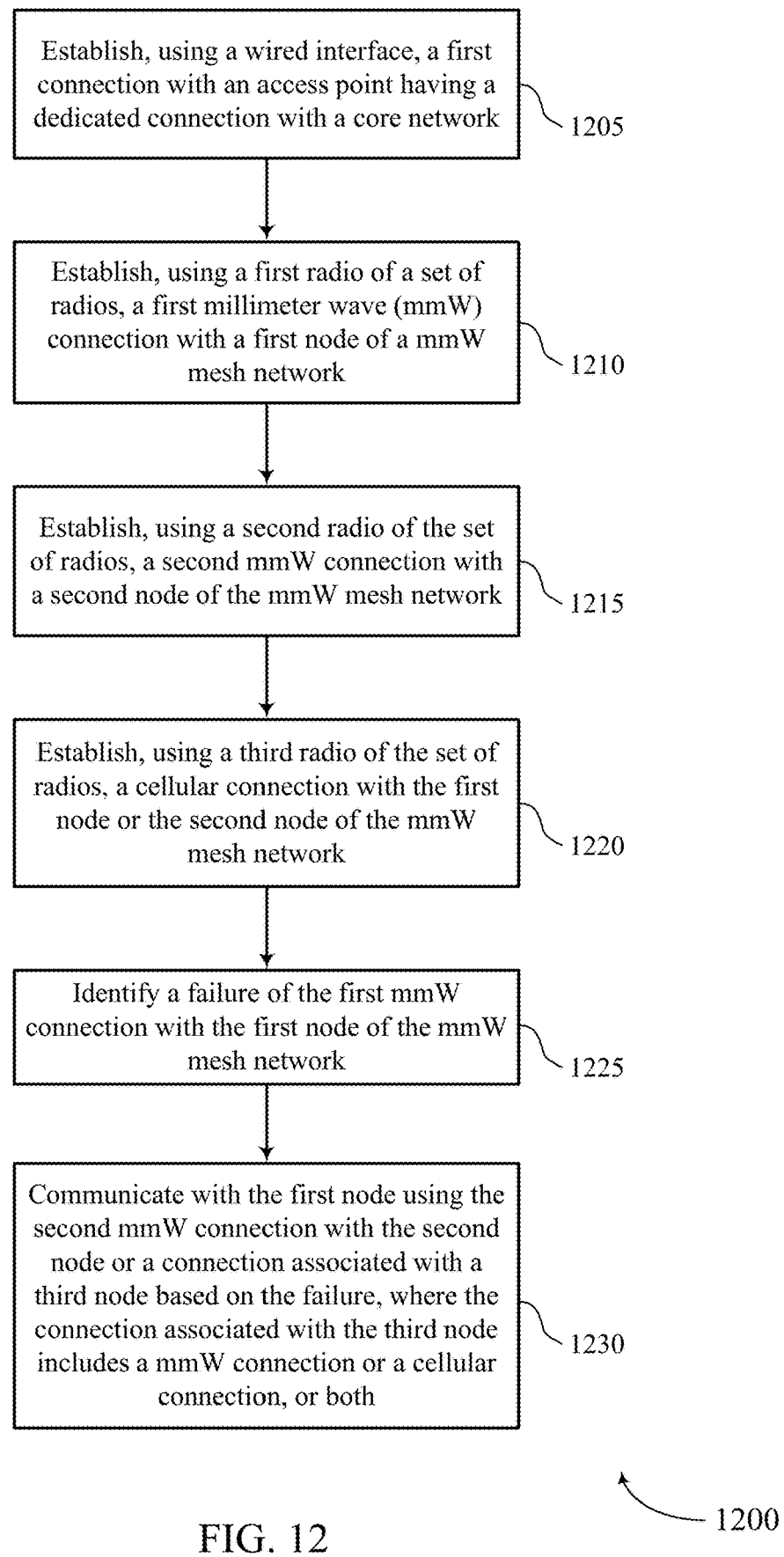

FIG. 12 shows a flowchart illustrating a method 1200 for mesh topology radio communications in accordance with aspects of the present disclosure. The operations of method 1200 may be implemented by a node 115 or its components as described herein. For example, the operations of method 1200 may be performed by a mesh communications manager as described with reference to FIGS. 6 through 9. In some examples, a node 115 may execute a set of codes to control the functional elements of the device to perform the functions described below. Additionally or alternatively, the node 115 may perform aspects of the functions described below using special-purpose hardware.

At block 1205 the node 115 may establish, using a wired interface, a first connection with an access point having a dedicated connection with a core network. The operations of block 1205 may be performed according to the methods described with reference to FIGS. 1 through 5. In certain examples, aspects of the operations of block 1205 may be performed by a connection establishing component as described with reference to FIGS. 6 through 9.

At block 1210 the node 115 may establish, using a first radio of a plurality of radios, a first mmW connection with a first node of a mmW mesh network. The operations of block 1210 may be performed according to the methods described with reference to FIGS. 1 through 5. In certain examples, aspects of the operations of block 1210 may be performed by a connection establishing component as described with reference to FIGS. 6 through 9.

At block 1215 the node 115 may establish, using a second radio of the plurality of radios, a second mmW connection with a second node of the mmW mesh network. The operations of block 1215 may be performed according to the methods described with reference to FIGS. 1 through 5. In certain examples, aspects of the operations of block 1215 may be performed by a connection establishing component as described with reference to FIGS. 6 through 9.

At block 1220 the node 115 may establish, using a third radio of the plurality of radios, a cellular connection with the first node or the second node of the mmW mesh network. The operations of block 1220 may be performed according to the methods described with reference to FIGS. 1 through 5. In certain examples, aspects of the operations of block 1220 may be performed by a connection establishing component as described with reference to FIGS. 6 through 9.

At block 1225 the node 115 may identify a failure of the first mmW connection with the first node of the mmW mesh network. The operations of block 1225 may be performed according to the methods described with reference to FIGS. 1 through 5. In certain examples, aspects of the operations of block 1225 may be performed by a connection failure component as described with reference to FIGS. 6 through 9.

At block 1230 the node 115 may communicate with the first node using the second mmW connection with the second node or a connection associated with a third node based on the failure. In some examples, the connection associated with the third node may include a mmW connection or a cellular connection, or both. The operations of block 1230 may be performed according to the methods described with reference to FIGS. 1 through 5. In certain examples, aspects of the operations of block 1230 may be performed by a connection failure component as described with reference to FIGS. 6 through 9.

Figure 13:
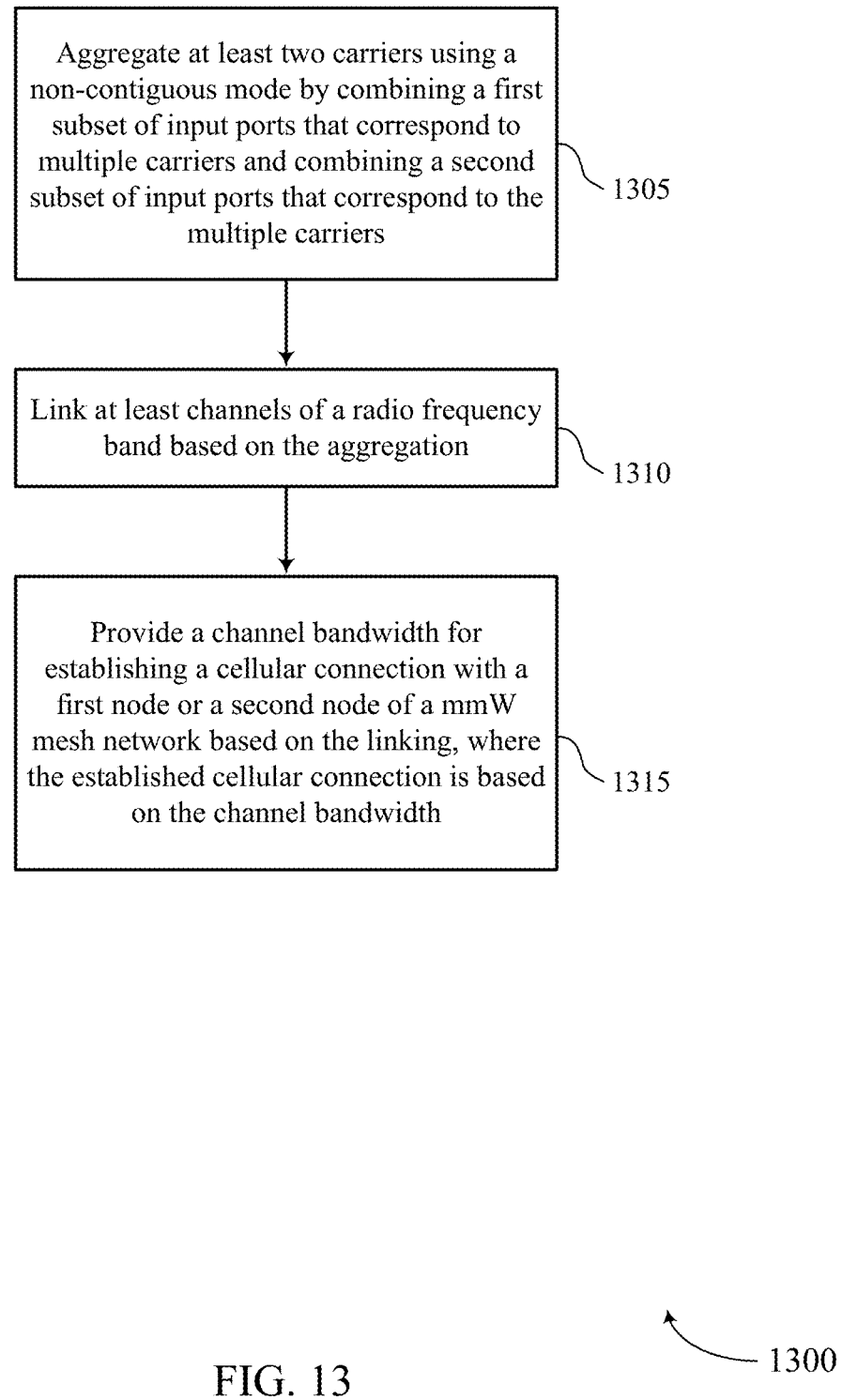

FIG. 13 shows a flowchart illustrating a method 1300 for mesh topology radio communications in accordance with aspects of the present disclosure. The operations of method 1300 may be implemented by a node 115 or its components as described herein. For example, the operations of method 1300 may be performed by a mesh communications manager as described with reference to FIGS. 6 through 9. In some examples, a node 115 may execute a set of codes to control the functional elements of the device to perform the functions described below. Additionally or alternatively, the node 115 may perform aspects of the functions described below using special-purpose hardware.

At block 1305 the node 115 may aggregate at least two carriers using a non-contiguous mode by combining a first subset of input ports that correspond to multiple carriers and combining a second subset of input ports that correspond to the multiple carriers. The operations of block 1305 may be performed according to the methods described with reference to FIGS. 1 through 5. In certain examples, aspects of the operations of block 1305 may be performed by a carrier aggregation component as described with reference to FIGS. 6 through 9.

At block 1310 the node 115 may link at least channels of a radio frequency band based on the aggregation. The operations of block 1310 may be performed according to the methods described with reference to FIGS. 1 through 5. In certain examples, aspects of the operations of block 1310 may be performed by a carrier aggregation component as described with reference to FIGS. 6 through 9.

At block 1315 the node 115 may provide a channel bandwidth for establishing a cellular connection with a first node or a second node of a mmW mesh network based on the linking. In some examples, the established cellular connection may be based on the channel bandwidth. The operations of block 1315 may be performed according to the methods described with reference to FIGS. 1 through 5. In certain examples, aspects of the operations of block 1315 may be performed by a channel bandwidth component as described with reference to FIGS. 6 through 9.

Figure 14:
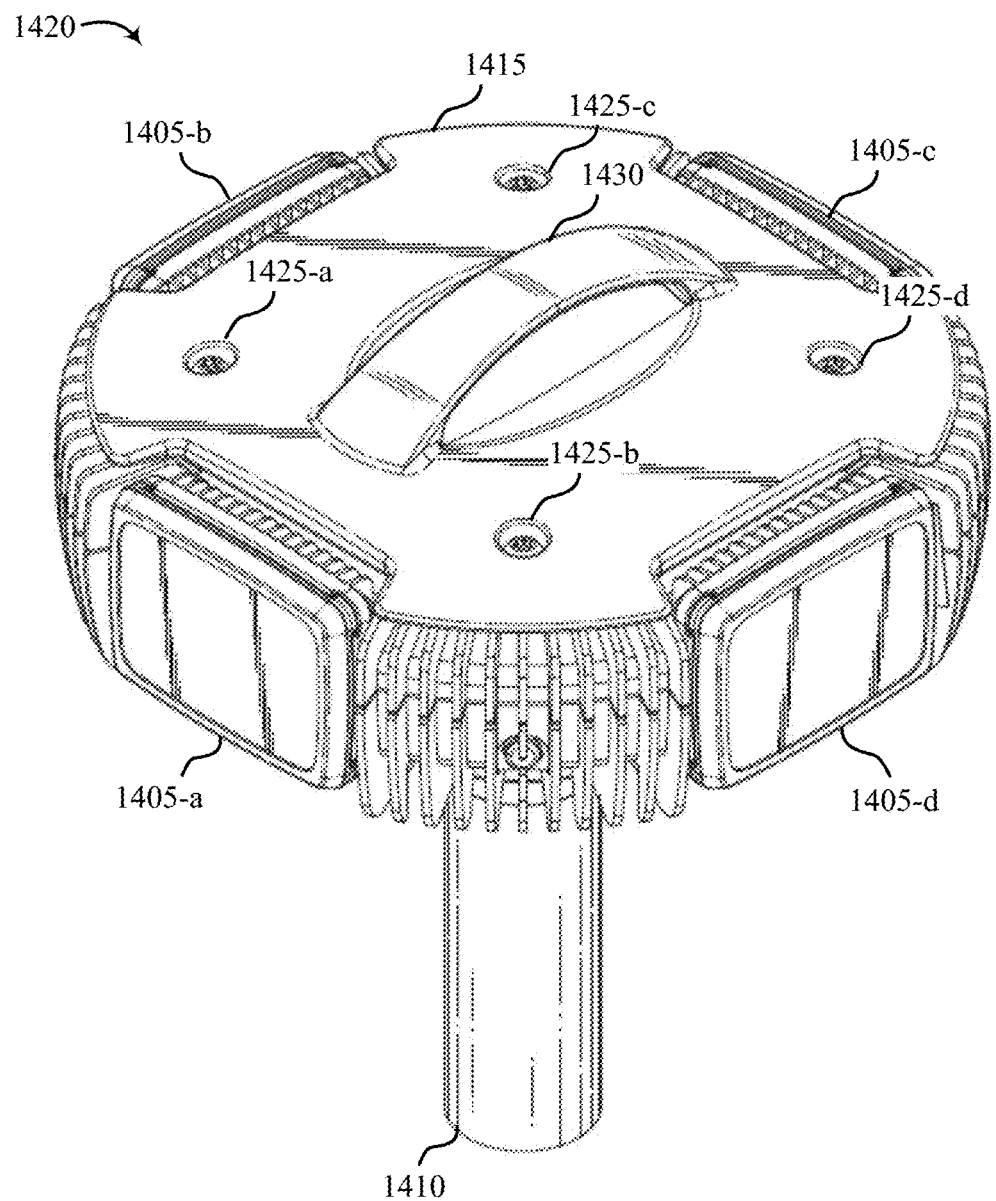
FIG. 14 illustrates an upper perspective view of a device that supports mesh topology radio communications in accordance with aspects of the present disclosure.

FIG. 14 illustrates an upper perspective view of a device 1400 that supports mesh topology radio communications in accordance with aspects of the present disclosure. In some cases, the components and the architecture of the device 1400 may enable site acquisition problems to be solved using an infrastructure-less deployment. The device 1400 may be an example of or include the components of wireless devices (e.g., nodes, APs) as described with reference to FIGS. 1 through 13.

The device 1400 may include a plurality of mmW radios 1405. The mmW radios 1405 may provide mmW mesh connectivity in a mmW mesh network. For example, the device 1400 may provide steerable point-to-multipoint features. In addition, the device 1400 may provide mesh networking topology management which may increase coverage and density for a network (i.e., mmW mesh network) based on the point-to-multipoint features. To provide a diverse range of coverage, the device 1400 may utilize the mmW radios 1405.

Each mmW radio 1405 may be configured to establish a mmW connection (e.g., a beamformed connection) with a node. For example, the device 1400 may transmit a plurality of signals (e.g., synchronization signals) to nodes in the mmW mesh network. To achieve 360 degree coverage, the mmW radios 1405 may be positioned proportionally and distributed circumferentially. For example, the device 1400 may include at least four mmW radios (i.e., a first mmW radio 1405-*a*, a second mmW radio 1405-*b*, a third mmW radio 1405-*c*, and a fourth mmW radio 1405-*d*) that may be positioned proportionally and distributed circumferentially around radio component 1420. In this example, each of the mmW radios 1405 may be configured to provide up to 90 degrees of coverage. As a result, a combined coverage of the mmW radios 1405 may be up to or equal to 360 degrees of coverage. Alternatively, the first mmW radio 1405-*a*, the second mmW radio 1405-*b*, the third mmW radio 1405-*c*, and the fourth mmW radio 1405-*d* may be positioned and distributed at a different height, or angle, or distance from each other on or relative to the radio component 420. In some examples, the mmW radios 1405 may be enclosed within a single housing of the device 1400.

In some examples, the device 1400 may establish, using at least one mmW radio 1405, a beamformed connection with another device in a mmW mesh network based on a RRC connection procedure. The RRC connection procedure may include a beam sweep procedure. For example, the device 1400 may perform a beam sweep by transmitting synchronization signals in different directions using beam sweeping. The device 1400 may transmit signals in four different directions when the device 1400 is operating in the 0-3 GHz range, or in eight different directions when the device 1400 is operating in the 3-6 GHz range, among other configurations based on the degree coverage of each mmW radio 1405.

For example, the first mmW radio 1405-*a* may transmit signals in a first direction, the second mmW radio 1405-*b* may transmit signals in a second direction, the third mmW radio 1405-*c* may transmit signals in a third direction, and the fourth mmW radio 1405-*d* may transmit signals in a fourth direction, each direction being different or offset by a degree value. In some examples, the device 1400 may receive information such as packets, user data, or control information associated with various information channels (e.g., control channels, data channels, and information related to mesh topology radios, etc.) from other nodes or network devices in the mmW mesh network. For example, the device 1400 may receive timing information to synchronize with a network (e.g., another node or network device) via at least one mmW radio 1405.

The device 1400 may also include a pole component 1410 (e.g., antenna pole). The radio component 1420 including the mmW radios 1405 may be coupled to the pole component 1410. In some cases, the radio component 1420 may have a length that extends in a first direction (e.g., vertical, horizontal). The length of the radio component 1420 may be greater than a width of the radio component 1420. Additionally, the pole component 1410 may extend in a second direction different from the first direction. The first direction may be orthogonal to the second direction. The pole component 1410 may have a uniform cross-section, while in other cases the pole component 1410 may have a non-uniform cross-section. The pole component 1410 may in some examples have a circular cross section. In some examples, the pole component 1410 may have a geometric shape. For example, the pole component 1410 may be a cylindrical, a rectangular, or a hexagonal shape and have a uniform cross-section.

The pole component 1410 in some examples may house a second radio component (not shown). In some cases, the pole component 1410 may have a cavity, and the second radio component may be positioned within the cavity. The cavity may extend a length of the pole component 1410. In addition, the cavity may have an internal circumference (e.g., diameter) appropriate for the second radio component to be positioned and housed within the cavity. The second radio component may be a type that is different from the first radio component, and may be or include, for example, a cellular radio (e.g., LTE radio). As such, the second radio component may be configured to establish a cellular connection with a node in the mesh network.

In some cases, the one or more of the mmW radios 1405 and a second radio component (not shown) (e.g., LTE radio) may be contained within a single housing of the apparatus 1400. The single housing may include a first portion and a second portion that may be coupled with the first portion. The first portion may be orthogonal to the second portion. In some cases, the first portion and the second portion may be coupled using a connection component positioned on a lower surface of the first portion. The first portion may have a length that extends in a first direction. The length may be greater than a width of the first portion. The second portion may have a length that extends in a second direction different from the first direction. The length may be lesser than width of the second portion.

In some examples, one or more of the mmW radios 1405 and the second radio component (not shown) may be configured to operate in a same or different power mode. For example, one or more of the mmW radios 1405 may be configured to operate in a first power mode (e.g., low power mode) and the second radio component may be configured to operate in a second power mode (e.g., high power mode). The mmW radios 1405 and the second radio component may also be configured to switch between different power modes based on requirements of the mesh network (i.e., scheduled transmission/reception, discontinuous transmission/reception). For example, in some cases one of or both of the mmW radios 1405 or the second radio component may transition to a low power mode (e.g., sleep mode) during discontinuous transmission/reception intervals, thereby conserving internal resources (e.g., power). As another example, in some cases one of or both of the mmW radios 1405 or the second radio component may transition to a low power mode (e.g., sleep mode) and the other may transition to a high power mode.

In some cases, one or more of the mmW radios 1405 or the second radio component (not shown) may be configured to operate as a primary radio or a secondary radio. For example, mmW radios 1405 may be configured to operate during a first duration and the second radio component may be configured to operate during a second duration. The first duration may be non-overlapping with the second duration in some cases. In other cases, the first duration may be concurrent with the second duration. The configuration may be based on resource requirements of the device 1400 in the mesh network. The device 1400 may use the mmW radios 1405 as a primary means for communication in a mesh network, and use the second radio component as a secondary means for communication (e.g., backup, standby).

For example, in the case of LOS or NLOS scenario between the device 1400 and a node, the device 1400 may use the mmW radios 1405 or the second radio component to communicate with the node. Although, examples are given where the mmW radios 1405 are used as a primary means for communication and the second radio component is used as a secondary means for communication, it should be understood that alternative embodiments are contemplated that include the secondary radio component being used as a primary means for communication and the mmW radios 1405 as secondary means for communication.

In some cases, one or more of the mmW radios 1405 may communicate on a first channel (e.g., radio frequency spectrum band) and the second radio component may communicate on a second channel (e.g., different radio frequency spectrum band). By communicating using different channels, the mmW radios 1405 and the second radio component (i.e., LTE radio) may operate (i.e., communicate, transmit, receive) concurrently in the network with minimum or no interference.

The device 1400 may also be configured with a cover component 1415 that may be coupled with an upper surface of the radio component 1420. The cover component 1415 may provide protection for the radio component 1420 from the effects of thermal heat and even lightning or to provide an environment where concealment of the device 1400 may be necessary for security (e.g., home security). For example, the pole component 1410 may be coupled to a base component installed on a structure (e.g., roof of a home). In some examples, to provide protection for the radio component 1420 from natural occurring elements (e.g., excessive thermal heat from the sun), the cover component 1415 may be coated (e.g., layered) with an ultra-violet high rating material. As a result, the cover component 1415 may operate as a solar heat shield to protect the radio component 1420 from solar load.

In some examples, the radio component 1420 may be configured with a set of fasteners or connectors positioned proportionally or randomly across the upper surface of the radio component 1420. Coupling the cover component 1415 with the upper surface of the radio component 1420 may be accomplished by a set of connection components 1425 positioned proportionally or un-proportionally across the upper surface of the radio component 1420. In addition, the cover component 1415 may include a single or set of connection components. As such, the cover component 1415 and the radio component 1420 may be coupled based on a union between a set of fasteners associated with the cover component 1415 and a set of fasteners associated with the radio component) 420.

In some examples, a connector or fastener may be magnetic-based or mechanical-based. In the mechanical-based examples, a fastener may include a threaded fastener having internal or external screw threads (e.g., screw, nut, bolt, stud). In the magnetic-based scenario, a connector may have a magnetic element that may be positioned on a surface of the connector. For example, a magnetic connector associated with the cover component 1415 may have a magnetic element positioned on a surface of the connector. The magnetic element may be biased to have a single surface express magnetic properties. The radio component 1420 may also have a magnetic connector having a magnetic element positioned on a surface of the connector that is also positioned on a portion of the upper surface. Similarly, the connector may also be biased to have a single surface embody magnetic properties. The cover component 1415 may magnetically couple with the radio component 1420 based on magnetic attraction between the first and second magnetic connectors.

In some cases, the cover component 1415 may be integrated with a handle component 1430. The handle component 1430 may provide efficient handling of the device 1400 by a personnel (e.g., for install and service operations). The handle component 1430 may be positioned and attached to a surface of the cover component 1415. In this case, the handle component 1430 may also be coated with a same material as the cover component 1415 (e.g., ultra-violet high rating material). In some cases, the handle component 1430 may provide benefits to the personnel in scenarios where access to an interior compartment of the radio component 1420 may be necessary for service and maintenance. In some examples, the handle component 1430 may have the capability to attach and detach from the cover component 1415. The handle component 1430 may have a fixed size (e.g., length or width, or both). Alternatively, the handle component 1430 may be configured to provide a variable size e.g., in length and width. The variable size may be provided based on a type or a material of the handle component 1430. A material of the handle may include plastic, carbon fiber, rubber, etc. A type of handle may include a pull handle or a twist handle, among others.

Figure 15:
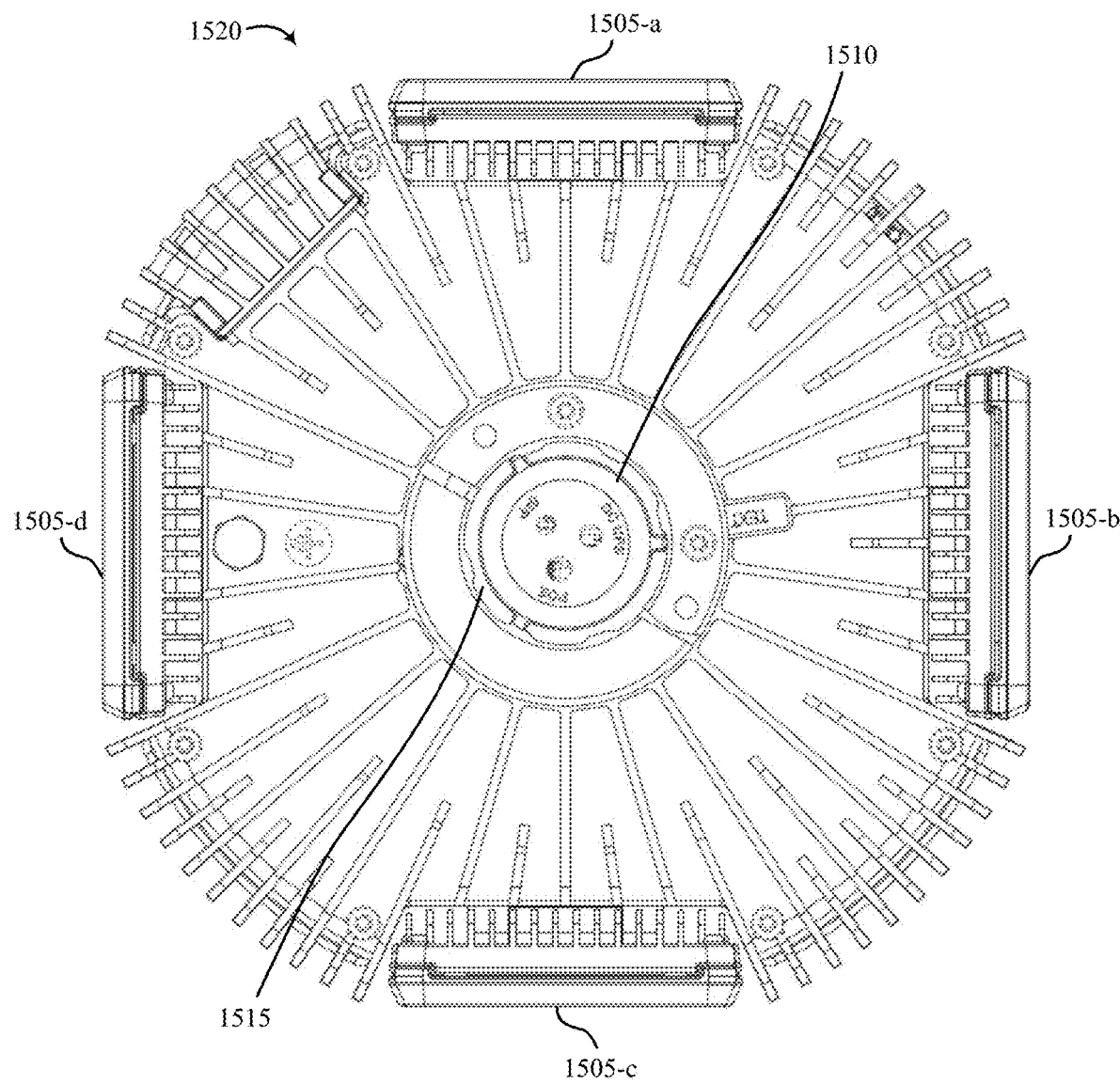
FIGS. 15 and 16 illustrate example lower perspective views of a device that supports mesh topology radio communications in accordance with aspects of the present disclosure.

FIG. 15 illustrates an example lower perspective view of a device 1500 that supports mesh topology radio communications in accordance with aspects of the present disclosure. In some cases, the components and the architecture of the device 1500 may enable site acquisition problems to be solved using an infrastructure-less deployment. The device 1500 may be an example of or include the components of wireless devices (e.g., nodes, APs) as described with reference to FIGS. 1 through 14.

The device 1500 may include a plurality of mmW radios 1505. The mmW radios 1505 may provide mmW mesh connectivity in a mmW mesh network. The device 1500 may provide 360 degree steerable point-to-multipoint features. In addition, the device 1500 may provide mesh networking topology management which may increase coverage and density for a network (i.e., mmW mesh network) based on the point-to-multipoint features. To provide a range of coverage, the device 1500 may utilize the mmW radios 1505.

In some cases, the radio component 1520 may be coupled to an antenna pole (not shown) (e.g., pole component 1410 as described with reference to FIG. 14). The antenna pole may be coupled with a first section 1510 of the radio component 1520. The first section 1510 may be positioned at a centric location on a lower surface of the radio component 1520. For example, the centric location may be a centroid of the lower surface. In some cases, the first section 1510 may be positioned at a different non-centric location on the lower surface of the radio component 1520. For example, the first section 1510 may be positioned at an edge of the lower surface of the radio component. The first section 1510 may include a connection component 1515. Coupling the antenna pole with the radio component 1520 may be achieved by using the connection component 1510. In some examples, the antenna pole may include a connector or fastener positioned at an upper surface. For example, in the scenario that the antenna pole is cylindrical or rectangular in shape, the connector or the fastener may be positioned at an upper surface of at least one of the bases of the antenna pole. In addition, the first section 1510 may include or be a connector or fastener. As such, the antenna pole and the radio component 1520 may be coupled based on a union between a connector associated with the antenna pole and a connector associated with the first section 1510. That is, the connector associated with the first section 1510 may be a receptacle that receives and holds the connector associated with the antenna pole, which results in the coupling.

Alternatively, the antenna pole and the radio component 1520 may be secured by the connection component 1515. The connection component 1530 and the antenna pole may share a same fastener. A common fastener may be in addition to or an alternative to the coupling described above between the first section 1510 and the antenna pole. In some examples, the connection component 1530 may provide a gap (e.g., circumferential gap) for the antenna pole to slot through and attach to the radio component 1520. For example, the connection component 1530 may be a single C-clamp. The C-clamp may have additional internal grips to provide sufficient force while protecting the antenna pole. The C-clamp may have a circumference appropriate for the antenna pole to slot through and fasten to radio component 1520 (e.g., or the first section of the radio component 1510). In some examples, a circumference of the C-clamp may be greater compared to a cross section area of the antenna pole, which provides the gap for the antenna pole to slit through and attach to the radio component 1520. As a result, the C-clamp may circumscribe a portion of the antenna pole, as described herein.

Figure 16:
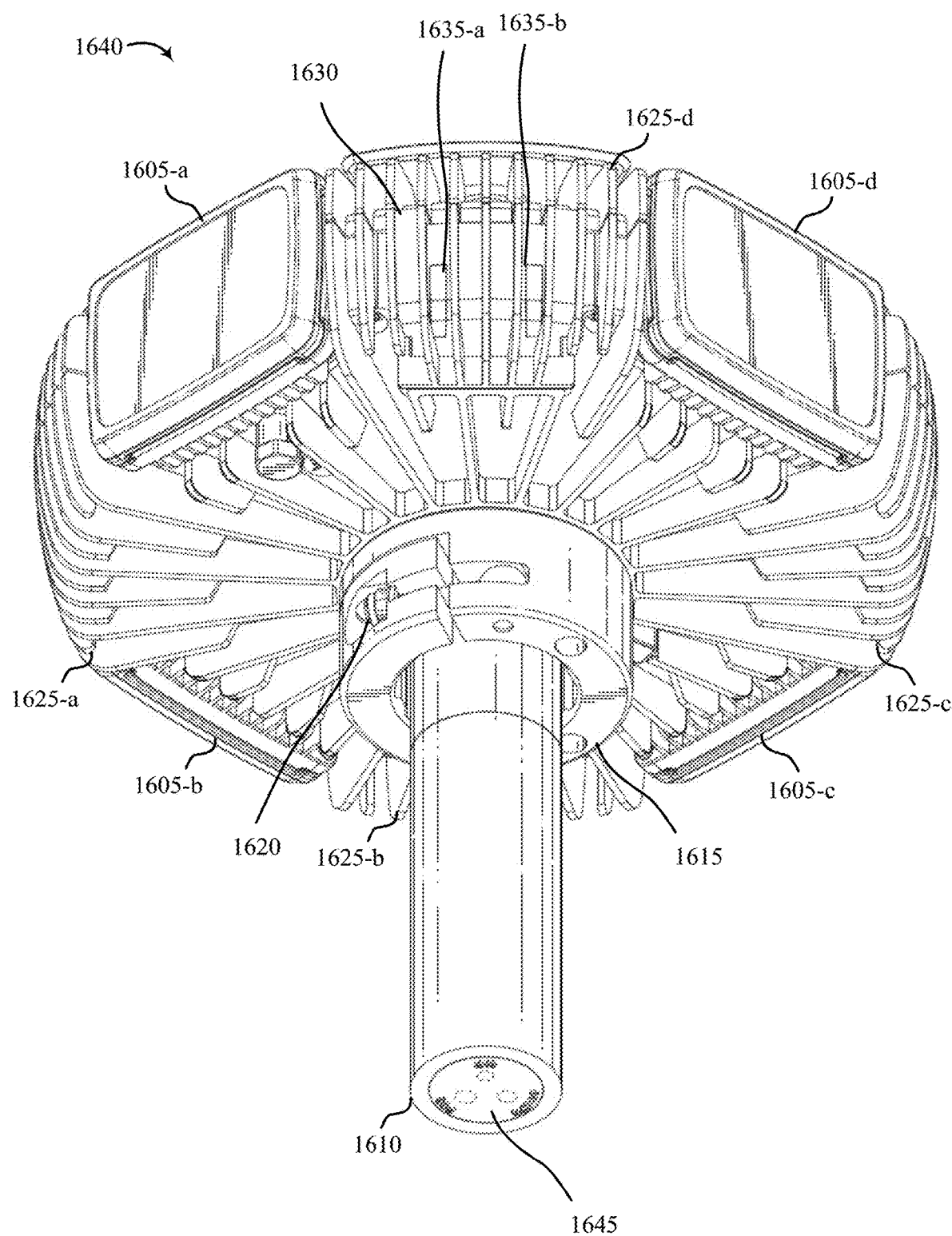

FIG. 16 illustrates an example lower perspective view of a device 1600 that supports mesh topology radio communications in accordance with aspects of the present disclosure. In some cases, the components and the architecture of the device 1600 may enable site acquisition problems to be solved using an infrastructure-less deployment. The device 1600 may be an example of or include the components of wireless devices (e.g., nodes, APs) as described with reference to FIGS. 1 through 15.

The radio component 1640 may include a plurality of mmW radios 1605. In some examples, the device 1600 may provide mmW mesh connectivity using at least one of the mmW radios 1605. In some cases, the device 1600 may provide 60 GHz radios with 6 to 8 Gbps aggregate capacity e.g., at least one of the mmW radios 1605. This may support and enable a mesh network for access and backhaul. The device 1600 may also remove LOS dependency and improve micro-site density in communication systems (e.g., mmW mesh and Wi-Fi mesh networks) using one or more cellular radios (e.g., LTE eNB radio). As a result, the device 1600 may support a number of connections to and from other nodes in a network.

In some cases, the radio component 1640 may be coupled to the pole component 1610 of the device 1600. The pole component 1610 may be a pole component having a specific geometric shape. For example, the pole component 1610 may be cylindrical in shape and have a uniform cross-section. The pole component 1610 may have a first end and a second end. The first end of the pole component 1610 may be coupled with a first section (e.g. a connection component 1615) of the radio component 1640. The first section may be positioned at a centric location on a lower surface of the radio component 1640. For example, the centric location may be a centroid of the lower surface. In some cases, the second end may be coupled with a base component configured to be installed on a structure (e.g., rooftop). The first end may be coupled with the first section using a first fastener type and the second end may be coupled with the base component using a second fastener type that may be different from the first fastener type.

Coupling the pole component 1610 with the radio component 1640 may be achieved by using the connection component 1615. In some examples, the pole component 1610 may include a connector or fastener positioned at an upper surface. For example, in the scenario that the pole component 1610 is cylindrical in shape, the connector or the fastener may be positioned at an upper surface of at least one of the bases of the pole component 1610. In addition, the first section may include or be a connector or fastener. As such, the pole component 1610 and the radio component 1640 may be coupled based on a union between a connector associated with the pole component 1610 and a connector associated with the first section. That is, the connector associated with the first section may be a receptacle that receives and holds the connector associated with the pole component 1610, which results in the coupling. Alternatively, the pole component 1610 and the radio component 1640 may be coupled based on a union between a fastener associated with the pole component 1610 and a fastener associated with the first section. In some examples, a fastener associated with the first section or the pole component 1610, or both may be a threaded fastener having internal or external screw threads (e.g., screw, nut, bolt, stud).

The connection component 1615 and the pole component 1610 may share a same fastener. A common fastener may be in addition to or an alternative to the coupling described above between the first section and the pole component 1610. In some examples, the connection component 1615 may provide a gap (e.g., circumferential gap) for the pole component 1610 to slot through and attach to the radio component 1640. For example, the connection component 1615 may include a single C-clamp. The C-clamp may have additional internal grips to provide sufficient force while protecting the pole component 1610. The C-clamp may have a circumference appropriate for the pole component 1610 to slot through and fasten to radio component 1640 (e.g., or the first section of the radio component 1640). In some examples, a circumference of the C-clamp may be greater compared to a cross section area of the pole component 1610, which provides the gap for the pole component 1610 to slit through and attach to the radio component 1640. As a result, the C-clamp may circumscribe a portion of the pole component 1610.

The device 1600 may also include a fastener 1620 that secures the connection component 1615 to the pole component 1610. For example, the fastener 1620 may be a screw. In the case where the connection component 1615 includes a C-clamp, the C-clamp may have a non-uniform geometric shape. For instance, the C-clamp may be configured with a fragment (e.g., ridge, recess, cavity) functioning as a receptacle for receiving the fastener 1620. In some examples, the fastener 1620 may be an anchor bolt, a latch, or a rivet, among others.

The pole component 1610 in some examples may house a second radio component 1645. In some cases, the pole component 1610 may have a cavity, and the second radio component 1645 may be positioned within the cavity. The cavity may extend a length of the pole component 1610. In addition, the cavity may have an internal circumference (e.g., diameter) appropriate for the second radio component 1645 to be positioned and housed within the cavity. The second radio component 1645 may be a cellular radio (e.g., LTE radio). As such, the second radio component 1645 may be configured to establish a cellular connection with a node in the mesh network.

In some examples, the device 1600 may establish, using at least one mmW radio 1605, a beamformed connection with another device in a mmW mesh network based on a RRC connection procedure. The RRC connection procedure may include a beam sweep procedure. For example, the device 1600 may perform a beam sweep by transmitting synchronization signals in different directions using beam sweeping. In some examples, the device 1600 may establish a beamformed connection at a first time based on an operating parameter associated with the device 1600. An operating parameter may include a measured CSI, a CQI, a RSSI, a QoS, a SNR, or any combination thereof. In some cases, during a RRC procedure, the device 1600 may measure a CSI or a CQI associated with signals transmitted from and received at the device 1600. For example, the device 1600 may determine a CQI from signals (e.g., synchronization signals) received from another device, which the device 1600 is attempting to establish a connection to. In some examples, the device 1600 may determine the CQI based on a SNR.

The device 1600 may determine a change in the operating parameter associated with the beamformed connection. For example, the device 1600 may determine a RSSI value or a SNR, or both, associated with signals transmitted and received via the beamformed connection, satisfy a threshold value. To preserve a QoS associated with information communicated via the beamformed connection, the device 1600 may establish a second connection different from the beamformed connection. The device 1600 may forward information communicated via the beamformed connection to the second connection. For example, the device 1600 may establish, using a cellular radio e.g., the second radio component 1645, a cellular connection with the other device at a second time based on performing a RRC connection procedure via the cellular radio. The RRC connection procedure may be an random access channel (RACH) procedure, a RRC connection request procedure, or a RRC connection release procedure. In some examples, the device 1600 may release the beamformed connection between the device 1600 and the other device based on the change in the operating parameter.

The device 1600 also may be configured with a number of flanges 1625 positioned proportionally and distributed circumferentially around the radio component 1640. In some cases, the flanges 1625 may be positioned sequential between consecutive mmW radios 1605 of the radio component 1640. The flanges 1625 may also extend across a lower surface of the radio component 1640. In some examples, the flanges 1625 may be assembled from same or different types of material. For example, a type of material associated with a flange 1625 may include carbon steel, alloy steel, stainless steel, nickel alloys, super alloys, titanium, among others. The flanges 1625 may also have same or different sizes (e.g., widths, lengths, shapes). In some cases, a number of flanges 1625 may be aligned and positioned relative to each other according to a configuration to reduce thermal stress on the device 1600. As a result, the radio component 1640 may be configured with outer-facing and inner-facing flanges 1625 to dissipate excessive heat from distressing the operation of the device 1600 (i.e., the mmW radios 1605). The radio component 1640 may also be configured with outer-facing and inner-facing flanges 1625 that may reduce or eliminate fluid presence that may impact operation of the mmW radios 1605.

One or more components of the device 1600 may be configured to also have modular capabilities. For example, the mmW radios 1605 or the number of flanges 1625, or both may include modular operations. For example, the mmW radios 1605 or the number of flanges 1625, or both may be related to modular assembly or operation, or both. Each flange 1625 may be configured to be modified, replaced, or maintained independently. For example, at least one flange 1625 may be defective (e.g., requires replacement), a maintenance personnel may replace the individual flange without having to replace other flanges 1625. In some cases, the mmW radios 1605 or the flanges 1625 may be configured with modular control. For example, the mmW radios 1605 may autonomously align with a desired transmission/reception direction based on the modular function. In some cases, a modular function of each mmW radio 1605 and flange 1625 may operate independently. For example, a modular function associated with a first mmW radio or flange may operate according to a first set of parameters and a modular function associated with a second mmW radio or flange may operate according to a second set of parameters different from the first set of parameters. A parameter of a set may include an operating state (e.g., ON/OFF), an angles associated with a vertical and a horizontal axis of a mmW radio 1605 or a flange 1625, an operating mode (e.g., low power mode, high power mode, sleep mode), etc. In some cases, the set of parameters for the modular function may be preconfigured during a manufacturing and assembly procedure, or may be defined by a personnel associated with the device 1600 (e.g., an end-user).

The device 1600 may also be integrated with a GPS and Wi-Fi component 1630 (e.g., GPS/Wi-Fi radome). For example, the GPS and Wi-Fi component 1630 may be coupled with at least one flange 1625 of the radio component 1640. The GPS and Wi-Fi component 1630 may provide geo-location information to one or more other devices (e.g., neighboring devices, a base station, etc.). Additionally or alternatively, the GPS and Wi-Fi component 1630 may also provide 60 GHz Wi-Fi capability.

The device 1600 may also be configured to provide notifications to a personnel. These notifications may include visual, auditory, tactile, or other notifications (e.g., indicators, reports, status). The GPS and Wi-Fi component may be configured with LED 1635-a or 1635-b, or both. The LED 1635 may provide a visual-based notification. For example, the LED 1635 may be configured to indicate an installation status, or a service code, or both associated with the device 1600 to a personnel present at a location of the device 1600.

Additionally, the LED 1635 may illuminate with certain characteristics including color, intensity, size, pattern (e.g., blinking pattern), or other visual-based information. In this case, a personnel may not have to be located within a vicinity of the device 1600 because the personnel may be capable of identifying the notification based on the LED 1635 broadcasting at a higher intensity. For instance, in the example that the device 1600 is installed and mounted on a roof of a building, the personnel may avoid climbing onto the roof to identify the notification because the notification may be identifiable to the personnel (e.g., at ground-level) based on the LED 1635 broadcasting at a higher intensity.

In some cases, the visual information may be presented with an assigned frequency (e.g., one time, multiple times) repeated over a duration. The assigned frequency and duration may be selected by the personnel. In some cases, the device 1600 may also include a plurality of LEDs. Each LED may be associated with different information (e.g., an operating status, service indicator, signal strength, device failure indicator etc.). In some examples, each LED 1635 may illuminate with same or varying intensities based on information determined, received, correlated, and/or measured relating to the device 1600. For example, the LED 1635-*a* may illuminate based on an power level of the device 1600, and the LED 1635-*b* may illuminate based on a failure indicator (e.g., loss of power, connection failure) of the device 1600.

Figure 17:
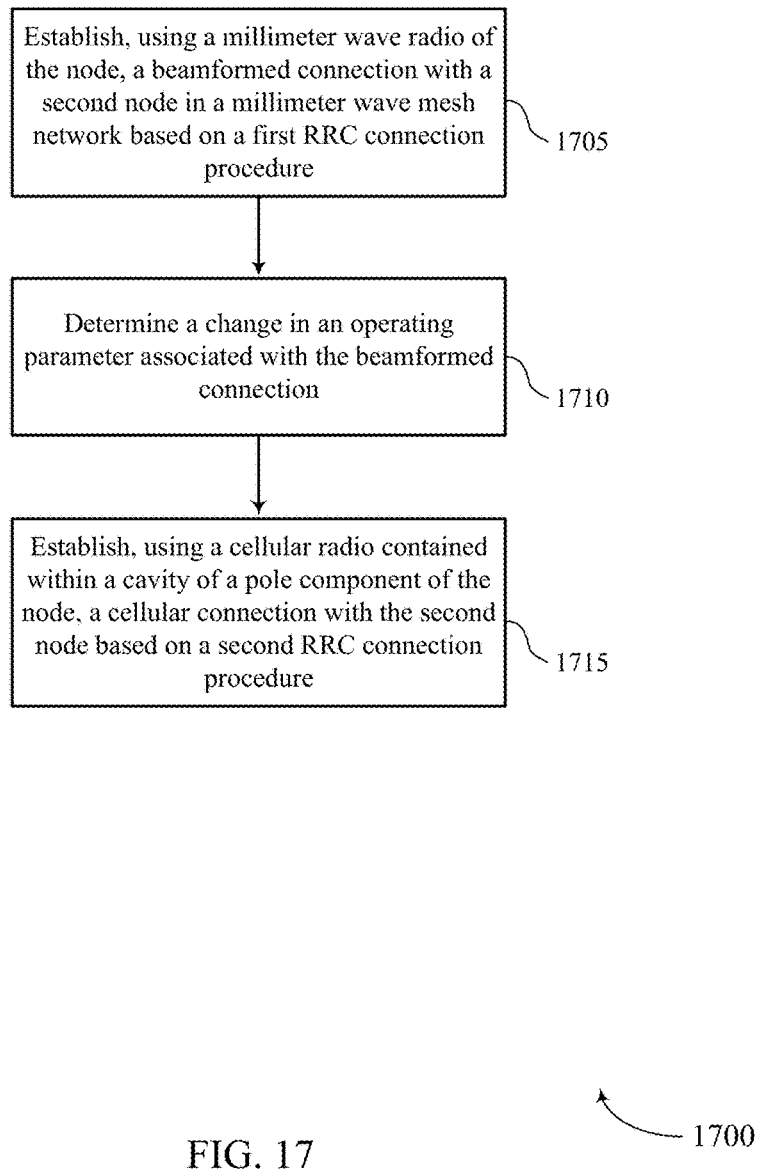
FIG. 17 illustrates a method for mesh topology radio communications in accordance with aspects of the present disclosure.

FIG. 17 shows a flowchart illustrating a method 1700 for mesh topology radio communications in accordance with aspects of the present disclosure. The operations of method 1700 may be implemented by a node 115 or its components as described herein. For example, the operations of method 1700 may be performed by a mesh communications manager as described with reference to FIGS. 6 through 9. In some examples, a node 115 may execute a set of codes to control the functional elements of the device to perform the functions described below. Additionally or alternatively, the node 115 may perform aspects of the functions described below using special-purpose hardware.

At block 1705 the node 115 may establish, using a mmW radio of the node, a beamformed connection with a second node in a mmW mesh network based on a first RRC connection procedure. The operations of block 1705 may be performed according to the methods described with reference to FIGS. 1 through 5. In certain examples, aspects of the operations of block 1705 may be performed by a connection establishing component as described with reference to FIGS. 6 through 9.

At block 1710 the node 115 may determine a change in an operating parameter associated with the beamformed connection. The operations of block 1710 may be performed according to the methods described with reference to FIGS. 1 through 5. In certain examples, aspects of the operations of block 1710 may be performed by a connection failure component, a topology analysis component, or channel bandwidth component as described with reference to FIGS. 6 through 9.

At block 1715 the node 115 may establish, using a cellular radio contained within a cavity of a pole component of the node, a cellular connection with the second node based on a second RRC connection procedure. The operations of block 1715 may be performed according to the methods described with reference to FIGS. 1 through 5. In certain examples, aspects of the operations of block 1715 may be performed by a connection establishing component as described with reference to FIGS. 6 through 9.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the nodes may have similar frame timing, and transmissions from different nodes may be approximately aligned in time. For asynchronous operation, the nodes may have different frame timing, and transmissions from different nodes may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, the system 100 and 200 of FIGS. 1 and 2—may include one or more carriers, where each carrier may be a signal made up of multiple sub-carriers (e.g., waveform signals of different frequencies).

The description plurality forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed plurality of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication in a millimeter wave (mmW) mesh network, comprising:
    a processor;
    memory in electronic communication with the processor;
    a radio component comprising a plurality of mmW radios in electronic communication with the processor, each mmW radio configured to establish a mmW connection with a node in the mmW mesh network;
    a plurality of flanges positioned proportionally and distributed circumferentially around the radio component and between the mmW radios; and
    a pole component coupled with a first section of the radio component.

2. The apparatus of claim 1, wherein the plurality of mmW radios are enclosed within a single housing of the radio component.

3. The apparatus of claim 1, wherein:
    the first section is positioned at a centric location on a lower surface of the radio component and comprises a connection component,
    the pole component being coupled with the connection component.

4. The apparatus of claim 3, wherein the pole component is coupled with the connection component using a single bolt C-clamp.

5. The apparatus of claim 4, further comprising:
    a fastener that secures the single bolt C-clamp with the pole component, wherein the fastener comprises a screw.

6. The apparatus of claim 1, wherein the plurality of mmW radios or the plurality of flanges, or both are configured to be modular.

7. The apparatus of claim 1, wherein the plurality of flanges extend across a lower surface of the radio component.

8. The apparatus of claim 1, wherein at least one of the flanges is coupled with a global position system (GPS) and Wi-Fi component.

9. The apparatus of claim 8, wherein:
    the GPS and Wi-Fi component is configured with a light-emitting diode (LED),
    the LED is configured to indicate an installation status, or a service code, or both.

10. The apparatus of claim 1, further comprising:
    a cover component configured as a heat shield for the radio component, wherein the cover component is coupled with an upper surface of the radio component, the cover component being made up of a ultra-violet high rating material.

11. The apparatus of claim 10, further comprising:
    a handle component positioned and attached to a surface of the cover component.

12. The apparatus of claim 1, wherein the plurality of mmW radios are positioned proportionally and distributed circumferentially around the radio component.

13. The apparatus of claim 1, wherein the radio component has a length that extends in a first direction, the length being greater than a width of the radio component, and wherein the pole component extends in a second direction different from the first direction.

14. The apparatus of claim 13, wherein the first direction is orthogonal to the second direction.

15. The apparatus of claim 1, further comprising:
a connection component comprising a connection interface extending a length of the pole component and a fastener that secures the connection interface with the pole component.

16. An apparatus for wireless communication, comprising:
a processor;
memory in electronic communication with the processor;
a radio component comprising a plurality of mmW radios in electronic communication with the processor, each mmW radio configured to establish a mmW connection;
a cover component coupled with an upper surface of the radio component;
a pole component coupled with a connection component positioned on a lower surface of the radio component, wherein the pole component is coupled with the connection component using a single connecter; and
a plurality of flanges positioned proportionally and distributed circumferentially around the radio component and between the mmW radios.

17. The apparatus of claim 16, wherein at least one of the flanges is coupled with a global position system (GPS) and Wi-Fi component.

18. An apparatus for wireless communication, comprising:
a processor;
memory in electronic communication with the processor;
a radio component comprising at least two mmW radios, in electronic communication with the processor, each configured to establish a mmW connection, wherein the at least two mmW radios are distributed circumferentially around the radio component;
a plurality of flanges positioned proportionally and distributed circumferentially around the radio component and between the mmW radios; and
a pole component comprising a first end and a second end:
the first end being coupled with a connection component positioned on a first side of the radio component; and
the second end being coupled with a base component configured to be installed on a structure.

19. The apparatus of claim 18, wherein the first end is coupled with the connection component using a first fastener type and the second end is coupled with the base component using a second fastener type that is different from the first fastener type.

* * * * *